(12) United States Patent
Choudhury et al.

(10) Patent No.: US 8,145,328 B2
(45) Date of Patent: Mar. 27, 2012

(54) DETECTION AND QUANTIFICATION OF STICTION

(75) Inventors: Md Ali A. Shoukat Choudhury, Dacca (BD); Sirish L. Shah, Edmonton (CA); Nina F. Thornhill, Edmonton (CA)

(73) Assignees: University of Alberta, Edmonton, Alberta (CA); Matrikon Inc., Edmonton, Alberta (CA)

( * ) Notice: Subject to any disclaimer, the term of this patent is extended or adjusted under 35 U.S.C. 154(b) by 419 days.

(21) Appl. No.: 11/570,861

(22) PCT Filed: Jun. 30, 2005

(86) PCT No.: PCT/CA2005/001031
§ 371 (c)(1),
(2), (4) Date: Aug. 2, 2007

(87) PCT Pub. No.: WO2006/002533
PCT Pub. Date: Jan. 12, 2006

(65) Prior Publication Data
US 2007/0288103 A1   Dec. 13, 2007

(51) Int. Cl.
G05B 13/02 (2006.01)
G05D 11/00 (2006.01)
(52) U.S. Cl. ............. 700/35; 700/32; 700/282; 700/289
(58) Field of Classification Search .................... 700/32, 700/55, 282, 289, 35
See application file for complete search history.

(56) References Cited

U.S. PATENT DOCUMENTS

| 4,282,467 A | 8/1981 | Gruesbeck | |
|---|---|---|---|
| 4,445,075 A | 4/1984 | Fry | |
| 5,137,257 A | 8/1992 | Tice | |
| 5,838,561 A * | 11/1998 | Owen | 700/32 |
| 6,138,810 A | 10/2000 | Fujii et al. | |
| 6,285,913 B1 * | 9/2001 | Hagglund | 700/45 |
| 6,798,606 B2 * | 9/2004 | Tang et al. | 360/77.08 |
| 7,047,152 B2 * | 5/2006 | Horch | 702/154 |
| 7,058,617 B1 * | 6/2006 | Hartman et al. | 706/16 |
| 7,797,082 B2 * | 9/2010 | Srinivasan et al. | 700/289 |
| 2007/0262741 A1 * | 11/2007 | Singhal et al. | 318/611 |

OTHER PUBLICATIONS

"Detection and Quantification of Control Valve Stiction", Choudhury, M.A.A. et al., 7th International Symposium of Dynamics and Control of Process Systems, (2004), Interational Federation of Automatic Control (IFAC).*

"Modelling Valve Stiction", Choudhury, M.A.A. et al., Control Engineering Practice, vol. 13, (2004), pp. 641-658.*

"Distributed Oscillations and Root-Cause Diagnosis", Thornhill, N.F. et al., Proceedings of CHEMFAS 4, (2001), pp. 167-172.*

(Continued)

*Primary Examiner* — Albert Decady
*Assistant Examiner* — Jennifer Norton
(74) *Attorney, Agent, or Firm* — Bennett Jones LLP

(57) ABSTRACT

An effective non-intrusive data-based monitoring method may reduce the cost of control loop performance maintenance by screening and short-listing those control loops or valves that need maintenance. The invention comprises a data-based, model-free, non-invasive method that can automatically detect and quantify stiction present in control valves. The method does not require the implementation of any additional valve travel test or, as commonly known, bump test of the control loop. The method may detect and quantify stiction using controlled variable (pv), controller output (op) and set point (sp) data. It does not require valve positioner (mv) data.

5 Claims, 23 Drawing Sheets

OTHER PUBLICATIONS

"Detection and Quantification of Valve Stiction", Choudhury, M.A.A. et al., American Control Conference, (2006), pp. 2097-2106.*

"Fault detection and isolation in the presence of process uncertainties", Han, Zhengang et al., Control Engineering Practice, vol. 13, (2005), pp. 587-599.*

"Application of a two-dimensional model of continuous sliding friction to stick-slip", Polycarpou, A.A. et al., $10^{th}$ Internation Conference on Wear of Materials, Wear, vols. 181-183, Issue 1, (1995), pp. 32-41.*

"A Simple Test to Confirm Control Valve Stiction", Choudhury, M.A.A. et al., The 16th IFAC World Congress, (2005).*

"Automatic detection and quantification of stiction in control valves", Choudhury, M.A.A.S. et al., Control Engineering Practice, vol. 14, (2006), pp. 1395-1412.*

"Stiction—definition, modeling, detection and quantification", Choudhury, M.A.A. et al., Proceedings of the 2006 American Control Conference, (2006), pp. 2097-2106.*

"Diagnosis of poor control-loop performance using higher-order statistics", Choudhury, M.A.A. et al., Automatica, vol. 40, Issue 10, (2004), pp. 1719-1718.*

"Detection and Diagnosis of System Nonlinearities Using Higher Order Statistics", Choudhury, M.A.A. et al., $15^{th}$ Triennial World Congress, IFAC (2002).*

Jones, Melvin. 2005. Closed Loop Control Performance Monitoring. Department of Chemical of Engineering Dissertation, University of Pretoria.*

Dulyakarn, Pornphan et al.; Fuzzy C—Means Clustering Using Spatial Information With Application to Remote Sensing; 22nd Asian Conference on Remote Sensing; Nov. 5-9, 2001; Singapore.

Hagglund, T.; A Control-Loop Performance Monitor; 1995; Control Eng. Practice; vol. 3, No. 11; pp. 1543-1551; Elsevier Science Ltd.

Horch, Alexander; A Simple Method for Detection of Stiction in Control Valves; Control Engineering Practice; 1999; vol. 7; pp. 1221-1231; Elsevier Science Ltd.

Rengaswamy, R. et al.; A Qualitative Shape Analysis Formalism for Monitoring Control Loop Performance; 2001; Engineering Application of Artificial Intelligence; vol. 14; pp. 23-33; Elsevier Science Ltd.

Ruel, Michel; Stiction: The Hidden Menace, How to Recognize This Most Difficult Cause of Loop Cycling; Reprinted with permission from Control Magazine; 2000; pp. 1-10; ExperTume Inc. website.

Gander, Walter et al.; Least-Squares Fitting of Circles and Ellipses; 1994; BIT 34; pp. 558-578.

* cited by examiner

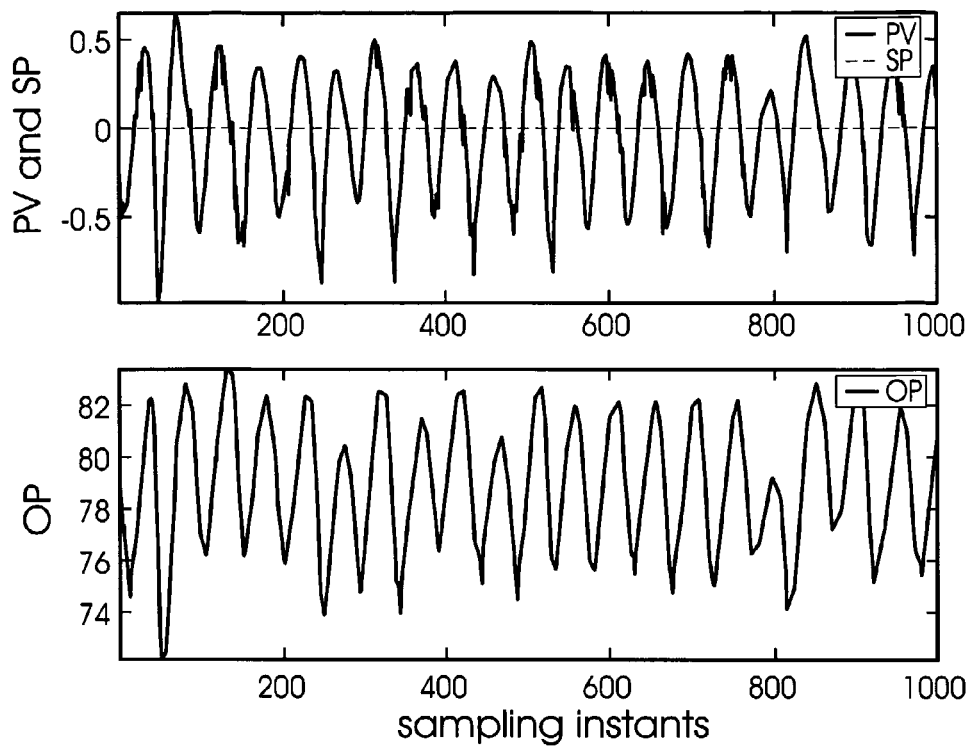
FIG. 9A
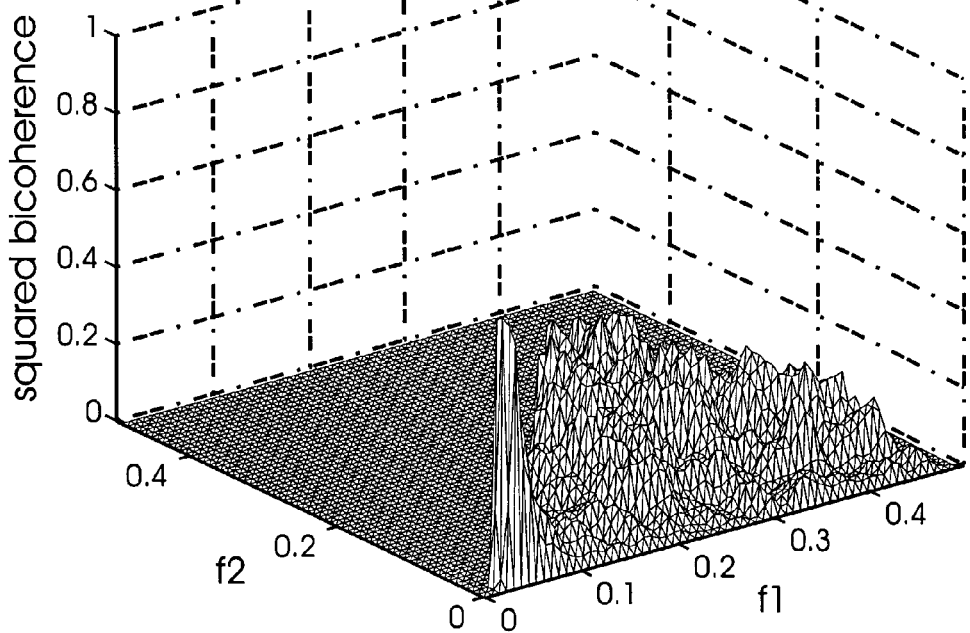
FIG. 9B  Max: bic(0.015625, 0.03125) = 0.69001

Max: bic(0.0078125,0.023438) = 0.078893

DETECTION AND QUANTIFICATION OF STICTION

FIELD OF THE INVENTION

The present invention relates to a method and apparatus for detecting and quantifying valve stiction in a process control loop.

BACKGROUND OF THE INVENTION

A typical process plant, such as a chemical, utility or metallurgical plant, has hundreds of control loops. Control performance is important to ensure tight product quality and low product cost in such plants. The presence of oscillation in a control loop increases the variability of the process variables, thus causing inferior quality products, larger rejection rates, increased energy consumption, reduced average throughput and reduced profitability. The only moving part in a control loop is the control valve, or other final control element. Control valves and other final control elements frequently suffer from problems such as stiction, leaks, tight packing, and hysteresis. There are reports that about 30% of control loops are oscillatory due to control valve problems.

If the final control element contains non-linearities, such as stiction, backlash, and deadband, the final output to the process may be oscillatory which in turn can cause oscillations in the process output. Among the many types of non-linearities in control valves, stiction is the most common and has been a long-standing problem in process industry. It hinders proper movement of the valve stem and consequently affects control loop performance. Stiction can easily be detected using invasive methods such as a valve travel or a bump test. Invasive methods require stroking or traveling the valve over its full travel span when in-service or out of service. This is now called the "valve travel test" in Instrument Society of America (ISA) standards (ISA-75.13-1996; ANSI/ISA-75.05.01-2000). Using this type of test, stiction can be quantified as the amount of changes required in the control signal to move the valve from its position where it was stuck. Since it is neither feasible nor cost-effective to invasively test hundreds of valves in a plant site, non-invasive methods are preferred. There have been many invasive tests or methods suggested for analysis and performance of control valves, however relatively few non-invasive studies or methods have been proposed.

Limitations of the few prior art non-invasive methods include non-compatibility with loops involving an integrator or compressible fluids, distortion of data by noise and other physical disturbances, data influenced by process or control dynamics and the requirement of obtaining a model of the process and many tuning parameters. One such non-invasive method for detecting stiction is Horch's cross-correlation method. The Horch method (Horch, 1999; Horch et al., 2000; Horch, 2000) detects stiction with the use of the cross-correlation function between pv and op. However, this method is not applicable for processes containing an integrator, for example, a level control loop, or for loops carrying a compressible medium such as steam or air. Horch's method is mainly useful for flow control loops. Even for flow control loops, it reportedly produces inconclusive results on occasion (Desborough and Miller, 2002). Also, if there is a sinusoidal disturbance entering the control loop, the method falsely detects stiction in the control valve (Choudhury et al., 2002, 2004c). Such disturbances are not uncommon.

Moreover, all known methods of detecting stiction can only detect stiction but cannot quantify it. Therefore, there is a need in the art for a non-invasive method capable of detecting stiction and it would be preferable if such methods were also capable of quantifying stiction. Such methods may be useful in the process industry to identify valves or other final control elements that need maintenance or repair.

SUMMARY OF THE INVENTION

A non-intrusive data-based monitoring method may reduce the cost of control loop performance maintenance by screening and short-listing those control loops or valves that need maintenance. The present invention comprises a data-based, model-free, non-invasive method that can automatically detect and quantify stiction present in control valves. In one embodiment, the method does not require the implementation of any additional valve travel test or, as commonly known, bump test of the control loop.

The method may detect and quantify stiction using controlled variable (pv), controller output (op) and set point (sp) data. It does not require valve positioner (mv) data. If mv data is available it is relatively easy to detect and quantify stiction from the mapping of mv and op. However, when mv data is not available, stiction cannot easily be detected because the mapping of pv and op is often confounded by the loop dynamics and disturbances. In the present invention, stiction may be detected with only pv and op data. In a preferred embodiment, sp data is also used. The methods of the present invention can be implemented in an off-line or online mode in a fully automated form or in a user-intervention form.

In one aspect, the invention comprises a non-invasive method for detecting stiction in a control loop. In one embodiment, the method first detects non-linearity in a control loop by the use of the sensitivity of the normalized bispectrum or bicoherence to the non-linear interactions that may be present in the control error signal. Peaks other than the maximum bicoherence peak may also be useful. In one embodiment, using only only pv and op data without sp data, the pv may be manipulated to provide an indication of the value about which the pv may be oscillating.

If non-linearity is detected, pv and op signals are filtered, such, as by using a frequency domain Wiener filter, to obtain filtered $pv_f$ and $op_f$ signals. If an ellipse, or other geometries such as a rectangle, can be fitted suitably onto the $pv_f$-$op_f$ plot, it indicates that the pv-op data conforms to a limit cycle, which is a signature of valve stiction. Then methods which determine the maximum width of the cycles of the $pv_f$-$op_f$ plot in the direction of $op_f$ may be used to quantify the amount of stiction. Such methods, including methods such as C-means clustering, fuzzy c-means clustering or fitted ellipse techniques, may be used to automatically quantify the amount of stiction.

In one aspect, the invention may comprise a non-invasive method for detecting stiction in a control loop comprising the steps of:
  (a) obtaining pv and op signals from the control loop;
  (b) detecting non-linearity in a control loop;
  (c) if non-linearity is detected, filtering the pv and op signals to obtain filtered $pv_f$ and $op_f$ signals and obtaining a $pv_f$-$op_f$ plot;
  (d) determining if the non-linearity arises from valve stiction by determining if a geometrical shape can be fitted onto the $pv_f$-$op_f$ plot.
Preferably, sp data is used to determine whether non-linearity is present in the control loop. If not, pv data may be manipulated to provide an indication of the value about which the sp may be oscillating.

In another aspect, the present invention may comprise a method for automatically detecting stiction in an industrial process. The method may comprise the steps of:

(a) obtaining pv and op data, from the process;
(b) determining whether or not the control error signal (sp-pv) is non-Gaussian and non-linear using pv as a proxy for sp;
(c) if the control error signal is both non-Gaussian and non-linear, then the process loop is non-linear;
(d) determining from the pv-op relationship whether or not the process is suffering from stiction by determining whether the pv-op relationship conforms to a limit cycle.

Preferably, sp data is used to determine whether the control error signal is non-Gaussian and non-linear which obviates the need to use pv data as a proxy for sp in step (b)

In one embodiment, the pv and op data are filtered prior to step (d), such as by using a frequency domain filter. Whether or not the pv-op relationship conforms to a limit cycle may be determined by fitting an ellipse onto the pv-op data or fitting a rectangle or any other geometry.

In a preferred embodiment, the amount of stiction may then be quantified using methods which estimate stiction as the maximum width of the cycles of the $pv_f$-$op_f$ plot in the direction of $op_f$. Suitable methods for quantification may include C-means clustering, fuzzy c-means clustering or fitted ellipse techniques.

BRIEF DESCRIPTION OF THE DRAWINGS

The invention will now be described by way of an exemplary embodiment with reference to the accompanying simplified, diagrammatic, not-to-scale drawings. In the drawings:

FIGS. 9(a)-9(d) show the results of a level control loop data analysis.

DETAILED DESCRIPTION OF THE INVENTION

The present invention provides for methods of determining whether or not an industrial process or process loop is suffering from valve stiction. When describing the present invention, all terms not defined herein have their common art-recognized meanings.

Stiction refers to static friction and is a property of an element such that its smooth movement in response to a varying input is preceded by a static part followed by a sudden abrupt jump called the slip-jump. Slip-jump is expressed as a percentage of the output span. Its origin in a mechanical system is static friction which exceeds the dynamic friction during smooth movement (Choudhury et al., 2004a). This definition of stiction forms the basis of the present invention. In the process industry, stiction is generally measured as a percentage of the valve travel or the span of the control signal (Gerry and Ruel, 2001). For example, a 2% stiction means that when the valve gets stuck it will start moving only after the cumulative change of its control signal is greater than or equal to 2% of the range of the control signal. If the range of the control signal is 4 to 20 mA then a 2% stiction means that a change of the control signal less than 0.32 mA in magnitude will not be able to move the valve.

It should be understood that the techniques described herein may be applied to other final control elements as well as valves. Therefore, when the term 'valve' is used is shall mean valves and other like final control elements.

Figure 1:
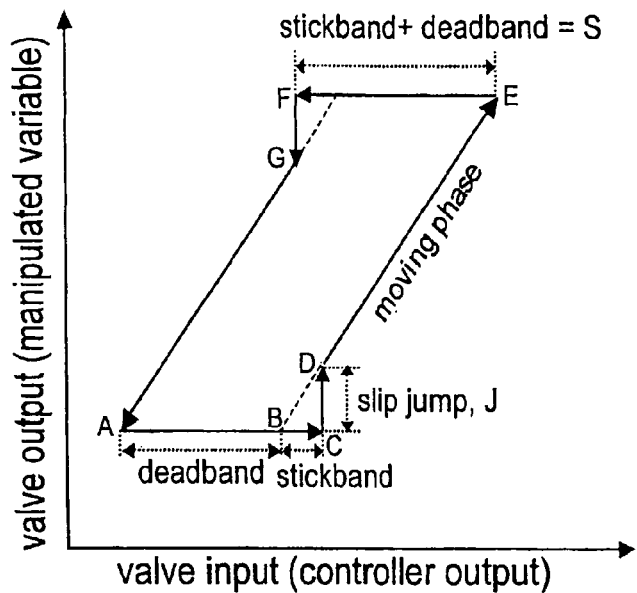
FIG. 1 is a plot of typical input-output behaviour of a sticky valve.

The phase plot of the input-output behavior of a valve suffering from stiction can be described as shown in FIG. 1. It consists of four components: deadband, stickband, slip jump and the moving phase. When the valve comes to a rest or changes the direction at point A in FIG. 1, the valve sticks. After the controller output overcomes the deadband (AB) plus the stickband (BC) of the valve, the valve jumps to a new position (point D) and continues to move. Due to very low or zero velocity, the valve may stick again in between points D and E in FIG. 1 while travelling in the same direction (En-Tech, 1998). In such a case the magnitude of deadband is zero and only stickband is present. This can be overcome if the accumulated change in controller output signal is larger than the stickband only. The deadband and stickband represent the behavior of the valve when it is not moving though the input to the valve keeps changing. The slip jump phenomenon represents the abrupt release of potential energy (stored in the actuator chambers due to high static friction) in the form of kinetic energy as the valve starts to move. The magnitude of the slip jump is important in determining the limit cyclic behavior introduced by stiction (Choudhury et.al., 2005, McMillan, 1995; Piipponen, 1996).

Once the valve jumps or slips, it continues to move until it sticks again (point E in FIG. 1). In this moving phase, dynamic friction is present which may be much lower than the static friction and will never be greater than the static friction.

It is difficult to estimate slip jump ('J') from the process or controlled variable (pv) and the controller output (op) data because the slip jump in the valve output is masked by the process dynamics. Therefore, in the present invention, the amount of stiction is represented by the parameter 'S' (deadband plus stickband).

In a control loop, a non-linearity may be present either in the process itself or in the control valve. In the present invention, it will be assumed that the process non-linearity is negligible in the vicinity of the operating point where the data will be collected. This is a reasonable assumption because the method will work with routine operating data of a control loop under regulatory control. In general, when processes are fairly well regulated at standard operating conditions, the plant can be assumed to behave linearly since the linear controller is capable of satisfactory regulation of the plant.

The method of the present invention examines control loop data for the presence of a non-linearity in the control loop. If a non-linearity is detected, then the process variable (pv), set point (sp) and controller output (op) signals are used to diagnose the possible causes of non-linearity.

A control loop containing valve non-linearities often produces non-Gaussian and non-linear time series, namely process output (pv) and controller output (op) data. Non-Gaussian signals are those signals for which the distribution does not conform to the Gaussian distribution. Non-Gaussian signals may include, for example, a signal with asymmetric distribution. Higher order statistics based non-linearity assessment can be used as a diagnostic tool for troubleshooting of hardware faults that may be present in a control loop (Choudhury et al., 2002; Choudhury et al., 2004b). The test of Gaussianity and non-linearity of the control error signal (sp-pv) is a useful diagnostic aid towards determining the poor performance of a control loop. The sensitivity of the normalized bispectrum or bicoherence to the presence of non-linear interactions in the signal may be used in one test. A distinctive characteristic of a non-linear time series is the presence of phase coupling such that the phase of one frequency component is determined by the phases of others. Phase coupling leads to higher order spectral features which can be detected in the bicoherence of a signal. The non-linearity test applied here uses bicoherence to assess the non-linearity. Bicoherence is defined as:

$$bic^2(f_1, f_2) \triangleq \frac{|B(f_1, f_2)|^2}{E[|X(f_1)X(f_2)|^2]E[|X(f_1+f_2)|^2]} \quad (1)$$

where $B(f_1; f_2)$ is the bispectrum at frequencies $(f_1, f_2)$ and is given by $$B(f_1, f_2) \triangleq E[X(f_1)X(f_2)X^*(f_1+f_2)], \quad (2)$$

$X(f)$ is the discrete Fourier transform of the time series $x(k)$ at the frequency $f$, $X^*(f)$ is the complex conjugate and $E$ is the expectation operator. A key feature of the bispectrum is that it has a non-zero value if there is significant non-linear interactions between the frequency components at $f_1$ and $f_2$ of signal x. The bicoherence gives the same information as the bispectrum but it is normalized as a value between 0 and 1.

Two indices may be used to determine non-linearity in the present invention: the Non-Gaussianity Index (NGI) and the Non-Linearity Index (NLI), which are defined as $$NGI \triangleq \widehat{bic^2} - \overline{bic^2}_{crit} \quad (3)$$

$$NLI \triangleq \left| \widehat{bic^2_{max}} - \left( \overline{\widehat{bic^2}} + 2\sigma_{\widehat{bic^2}} \right) \right| \quad (4)$$

where, $\overline{\widehat{bic_2}}$ is the average squared bicoherence and $\widehat{bic}_{2\,max}$ is the maximum squared bicoherence, $\sigma_{bic}^2$ (or using the MS equation object as: $\sigma_{bic}^2$) is the standard deviation of the squared bicoherence and $bic^2_{crit}$ is the statistical threshold/critical value obtained from the central chi-square distribution of squared bicoherence. If both NGI and NLI are greater than zero, the signal is described as non-Gaussian and non-linear. The details of the procedure are shown in the flowchart in FIG. 2. The test can be applied to any time series to check its non-Gaussianity and non-linearity. For a control loop, this test is preferably applied to the error signal (sp-pv) because the error signal is more stationary than pv or op signal. However, it can be applied to pv or op signals as well. The pv signal may be manipulated to provide an indication of the value about which the pv may be oscillating. One may apply a stationarity test to the pv signal, or a segment of the pv data. Alternatively, one may apply an aggregation such a mean function or a low pass filter to the pv signal to provide a proxy for the set point.

If the error signal is found to be non-Gaussian and non-linear, then it is inferred that the loop in question exhibits significant non-linearity. The non-linearity can be attributed to the control valve under the following assumptions:

The process is locally linear.

No non-linear disturbance is entering the loop.

If the disturbance is measurable, the test can be applied to check the linearity of the disturbance. One may also argue that the valve itself may have a non-linear characteristic, e.g., a square-root or equal percentage characteristic, which is definitely not a fault. To clarify, a simulation study (Choudhury, 2004c) has been performed using equal percentage and square root valve characteristics in a simple feedback system. It was found that if the movement of the valve stem or the change in input signal to valve is within ±20% of the full span (0 to 100%) of the valve travel, a control loop exhibits linear behavior under steady state regulatory control. It can also be realized by careful observation of the valve characteristic curves.

The higher order statistics based NGI and NLI indices can easily be calculated for each loop in an entire plant site and the loops that exhibit non-linear behavior can be isolated for further diagnosis. Once a loop is identified as non-linear, the causes of non-linearity should be diagnosed. With the assumptions listed above it can be concluded that the valve is responsible for the loop non-linearity. Once it is conclude valve non-linearity exists, it remains to decide whether this valve non-linearity is due to stiction or something else. To reach this decision, specific patterns in pv-op plot may be used.

The pv-op plot has been used for the detection of valve problems, especially stiction. However, this type of method is successful only for a few cases of flow control loops. The use of pv-op plot for detecting valve problems was not successful because it only takes into account the qualitative trend information of the time series, which can be destroyed due to the presence of process dynamics, noise dynamics, disturbances and tightly tuned controllers. In the present invention, the pv-op plot is used as a second step to diagnose the valve non-linearity problem, not for the detection of the valve problems. The detection of valve non-linearity is carried out by using higher order statistical based NGI and NLI indices. If the non-linearity is detected, only then should the pv-op plot be used to diagnose or isolate it.

Because of the contamination of real life data with noise/disturbance, a pv-op plot is often unclear and ambiguous, and it is difficult to find any information from it. Thus, in one embodiment, it is preferred to use a filter to clean the data.

Since the non-linearity detection is a frequency domain method, it is preferable to use frequency domain based filtering. Upon detection of non-linearity, the frequencies responsible for the significant non-linear interactions can be determined from the significant peaks in the squared bicoherence plot. A frequency domain filter such as a Wiener filter may be used to obtain the part or parts of the signal which contribute significantly to the signal non-linearity. In one embodiment, both pv and op are filtered using a frequency domain Wiener filter. The frequency-domain Wiener filter sets the power in unwanted frequency channels to zero. In one example, the filter used is an approximate realization of a Wiener filter (Press et al., 1986) because a true Wiener filter also requires an estimate of the noise power within the wanted frequency channels which would then be subtracted from those channels. The detailed design algorithm is given in Thornhill et. al. (2003) which explains how to deal with aliased frequencies above the Nyquist frequency and constraints on the filter width. The frequency ranges for the filters are selected from the inspection of the peaks in the bicoherence plot. It is preferable to use a large number of data points (e.g., 4096 samples) for the non-linearity detection algorithm. The filtering is also performed on the same data sets. But the use of such a large number of data points in the $pv_f$-$op_f$ plot may produce a plot which is difficult to match with any known pattern of valve problems. Therefore, in one embodiment, a segment of the data consisting of only several hundred data points may be chosen for the construction of the $pv_f$-$op_f$ plot. Note $pv_f$ and $op_f$ are the filtered pv and op signals.

The segment of the data to be chosen is preferably that segment which has the most regular oscillation(s) because valve problems often produce limit cycles in the data. Thornhill et al. (2003) described a method for the assessment of the period and the regularity of oscillation of a time series. Zero-crossings of the auto-covariance function of the time series are used to estimate the period of oscillation. An oscillation is considered to be regular if the standard deviation of the period of oscillation ($\sigma_{T_p}$ or $\sigma_{T_p}$) is less than one third of the mean value of the period of oscillation ($T_p$). The statistic used is:

$$r = \frac{1}{3} \frac{\overline{T_p}}{\sigma_{T_p}} \quad (5)$$

A value of r greater than 1 indicates a regular oscillation with a well defined period. The filtered controller output signal ($op_f$) maybe divided into some segments of user defined length that can be decided based on the period of oscillation. The segment of $op_f$ corresponding to the highest value of r is used for the $pv_f$-$op_f$ plot, where $pv_f$ is the corresponding counterpart of $op_f$. Preferably, the data segment corresponding to the highest value of r is chosen because valve non-linearities such as stiction and deadband are measured as the maximum width of the cycles in the direction of valve input signal in a valve characteristic plot.

If the valve positioner data is available (as would be the case for 'smart valves'), a plot of valve output signal (mv) vs. valve input signal (op) can be used to quantify stiction very easily. In most practical cases, valve output or positioner data is not available, and therefore stiction must be estimated from the available data of controlled output (pv), controller output (op) and the set point (sp) variables. In the present invention, stiction is estimated as the maximum width of the cycles of the $pv_f$-$op_f$ plot at the direction of $op_f$. The quantified stiction is termed as "apparent stiction" because the actual amount of stiction to be obtained from the mv-op plot may differ from the estimated quantity because of the effect of loop dynamics on the controlled variable, pv, in particular the effect of the controller to compensate or fight stiction.

The detection and diagnosis algorithm of the present invention can identify stiction in a large number of control valves. Some of them may be sticky by an acceptable amount for the current application in hand while some others may suffer from severe stiction and need immediate maintenance of the valve. Therefore, it is important to be able to quantify stiction so that a list of sticky valves in order of their maintenance priority can be prepared. It is well known (Hagglund, 1995; Horch, 1999; Ruel, 2000; Rengaswamy et al., 2001) that the presence of stiction in a control valve in a control loop produces limit cycles in the controlled variable (pv) and the controller output (op). For such a case, if pv is plotted against op, it produces cyclic patterns in the resulting pv-op plot. A large number of such plots can be found in (Choudhury et al., 2004a; Choudhury et al., 2005), where stiction models were used in a closed loop SISO system to produce data for these plots. An ellipse can be fitted to such a $pv_f$-$op_f$ plot. The $pv_f$-$op_f$ plot along with any of the following two methods can be used to quantify stiction in the unit of op signal. Note that it is not necessary for the plot to be physically drawn or presented to a user. A plot is merely a useful descriptive tool for explanation. Fitting of an ellipse or other geometry is an automated mathematical procedure, not a graphical one carried out by a user.

Clustering is a method for dividing scattered groups of data into several groups. Since the pv-op plot for a control loop with a sticky valve exhibits elliptic patterns, the data corresponding to a narrow strip along the mean of pv and parallel to the op axis can be collected (see FIG. 4(c)) and used for quantifying stiction with the help of C-means or fuzzy C-means clustering method, described in more detail below.

With the C-means clustering method, data is partitioned into C number of initial clusters. Then proceeding through all data points, each point is assigned to the nearest cluster (in terms of Euclidean distance). The centroids for the cluster receiving the new item and for the cluster losing the item are recalculated. This procedure is repeated until no more reassignments take place. The method is fully described in (Johnson and Wichern, 1998). This method requires the initialization of the centers of the clusters. In the present invention, there are only two clusters and the centers can be specified as [min($op_f$), mean($pv_f$)] and [max($op_f$), mean($pv_f$)] calculated from the data obtained along the stripe in the $pv_f$-$op_f$ plot (see FIG. 4(c)).

The fuzzy C-means clustering method as described in (Dulyakam and Rangsanseri, 2001; Bezdek, 1981) works based on the minimization of the following objective function.

$$J_m(U, V) = \sum_{j=1}^{n} \sum_{i=1}^{c} u_{ij}^m \|X_j - V_i\|^2, \quad 1 \le m < \infty \quad \text{(A-1)}$$

where, U is a fuzzy c-partition of the data set, V is a set of K prototypes, m is any real number greater than or equal to 1, $u_{ij}$ is the degree of membership of $X_j$ in the cluster i, $X_j$ is the $j^{th}$ observation of the d-dimensional measured data, $V_i$ is the d-dimension center of the cluster, and $\|*\|$ is any norm expressing the similarity between any measured data and the center of the cluster. Through an iterative optimization of equation A-1, fuzzy partition is carried out with the update of membership of $u_{ij}$ and the cluster centers $V_i$ using the following equations.

$$u_{ij} = \frac{1}{\sum_{k=i}^{c} \left(\frac{d}{d}\right)^{\frac{2}{m-1}}} \quad \text{(A-2)}$$

$$V_i = \frac{\sum_{j=1}^{n} u_{ij}^m X_j}{\sum_{j=1}^{n} u_{ij}^m} \quad \text{(A-3)}$$

where, $d_{ij}$ is the Euclidean distance between the observation $X(j)$ and the center of the cluster $V_i$. The criteria to end the iteration is $\max(|u_{ij}i \hat{u}_{ij}j|) < \gamma$, where $\gamma$ is a number close to zero and $\hat{u}_{ij}$ is the membership number at the previous iteration step. The number of clusters is two and $10^{-5}$ was used as the magnitude of $\gamma$.

The amount of stiction can be estimated from the absolute value of the difference between x co-ordinates of the centers of the two clusters. If the final centers of the clusters are ($op_1$; $pv_1$) and ($op_2$; $pv_2$), then the amount of stiction is obtained using the following expression:

$$\text{stiction} = |op_1 - op_2| \qquad (6)$$

In another embodiment, an ellipse in the least square sense can be fitted in the $pv_f$-$op_f$ plot and can be used for quantifying stiction. A brief description of the theory of ellipse fitting is set forth below and is further described in Gander et al., 1994.

Assume that given data points are op and pv, where, $$op = [op(1), op(2), \ldots, op(N)]^T \qquad (B\text{-}1)$$

$$pv = [pv(1), pv(2), \ldots, pv(N)]^T \qquad (B\text{-}2)$$

Starting with the general equation of conics, the equation of an ellipse can be developed. The equation for any conic in the ordinary X-Y co-ordinate is given by the following equation $$a_1 x_1^2 + a_{12} x_1 x_2 + a_2 x_2^2 + b_1 x_1 + b_2 x_2 + c = 0 \qquad (B\text{-}4)$$

or, $$\Phi\theta = 0 \qquad (B\text{-}5)$$

where, $\Phi = [x_1^2 \; x_1 x_2 \; x_2^2 \; x_1 \; x_2 \; 1]$ and $\theta = [a_1 \; a_{12} \; a_2 \; b_1 \; b_2 \; c]^T$.

Now, for a given data set, the above equation can be solved as a constrained least squares problem: $\|\Phi\theta\| = \min$ subject to $\|\theta\| = 1$.

Often the given data sets require a linearly shifted and rotated conic. Therefore, there is a need to fit a rotated and shifted conic in a transformed co-ordinate X-Y (see FIG. 4(f)). The equation B-4 can be rewritten as:

$$x^T A x + b^T x + c = 0 \qquad (B\text{-}6)$$

with $A = [a_1 \; 0.5 a_{12}; 0.5 a_{12} \; a_2]$, $b = [b_1 \; b_2]^T$. Note that A is symmetric and positive definite. Let us use the following equation for the transformation of the equation in new co-ordinate system X-Y, $$x = Q\bar{x} + t \qquad (B\text{-}7)$$

where Q is the matrix for rotational transformation and t is the vector in the original X-Y co-ordinate for a linear shift of the conic. Using equation B-7, the equation of the conic in the transformed co-ordinate can be written as:

$$\bar{x}^T Q^T A Q \bar{x} + (2t^T A + b^T) Q \bar{x} + t^T A t + b^T t + c = 0 \qquad (B\text{-}8)$$

This can be rewritten in the following simplified form $$\bar{x}^T \bar{A} \bar{x} + \bar{b}^T \bar{x} + \bar{c} = 0 \qquad (B\text{-}9)$$

where, $$\bar{A} = Q^T A Q \qquad (B\text{-}10)$$

$$\bar{b}^T = (2t^T A + b^T) Q \qquad (B\text{-}11)$$

$$\bar{c} = t^T A t + b^T t + c \qquad (B\text{-}12)$$

Now, Q is chosen so that $\bar{A} = \text{diag}(\lambda_1, \lambda_2)$. One way to choose Q is for it to be the same as the eigenvector matrix obtained from the eigenvalue decomposition of the matrix A. If the conic is an ellipse with its center at the origin of the new co-ordinate $\bar{X}$-$\bar{Y}$ then in equation B-9, $$\bar{b} = 0 \qquad (B\text{-}13)$$

Therefore, the equation B-9 can be simplified as $$\lambda_1 \bar{x_1}^2 + \lambda_2 \bar{x_2}^2 + \bar{c} = 0 \qquad (B\text{-}14)$$

or, $$\frac{\bar{x_1}^2}{\sqrt{\frac{-\bar{c}}{\lambda_1}}} + \frac{\bar{x_2}^2}{\sqrt{\frac{-\bar{c}}{\lambda_2}}} = 1 \qquad (B\text{-}15)$$

or, $$\frac{\bar{x_1}^2}{m^2} + \frac{\bar{x_2}^2}{n^2} = 1 \qquad (B\text{-}16)$$

where, $$m = \sqrt{\frac{-\bar{c}}{\lambda_1}}, \; n = \sqrt{\frac{-\bar{c}}{\lambda_2}} \qquad (B\text{-}17)$$

The lengths of the axes of the ellipse will be invariant to the transformation. Therefore, in the original co-ordinate X-Y, the lengths of the axes of the ellipse are 2m and 2n, respectively. The center of the ellipse is at t which can be calculated from $t = 0.5 A^{-1} b$ (obtained using equation B-13). The angle of rotation of the ellipse ($\forall$, measured anti-clockwise from positive X axis) can be calculated using any one of the eigenvectors. Since the eigenvectors are of unit length, the equation B-7 can be written as $$x_1 = \bar{x}_1 \cos\alpha - \bar{x}_2 \sin\alpha + t_1 \qquad (B\text{-}18)$$

$$x_2 = \bar{x}_1 \sin\alpha + \bar{x}_2 \cos\alpha + t_2 \qquad (B\text{-}19)$$

Figure 4A:
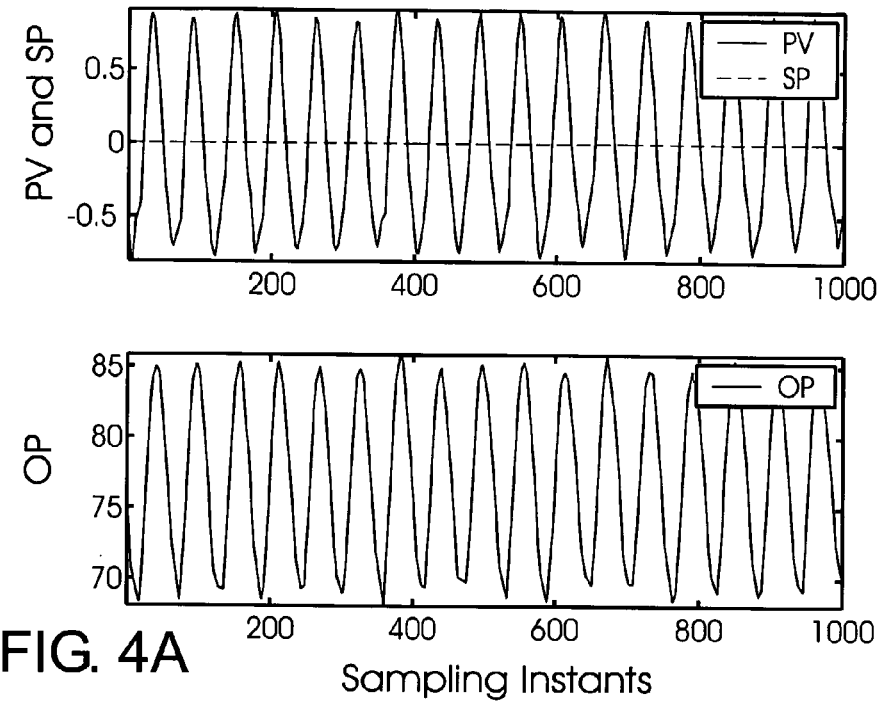
FIGS. 4(a)-4(f) show the results of a level control loop data analysis.
Figure 4B:
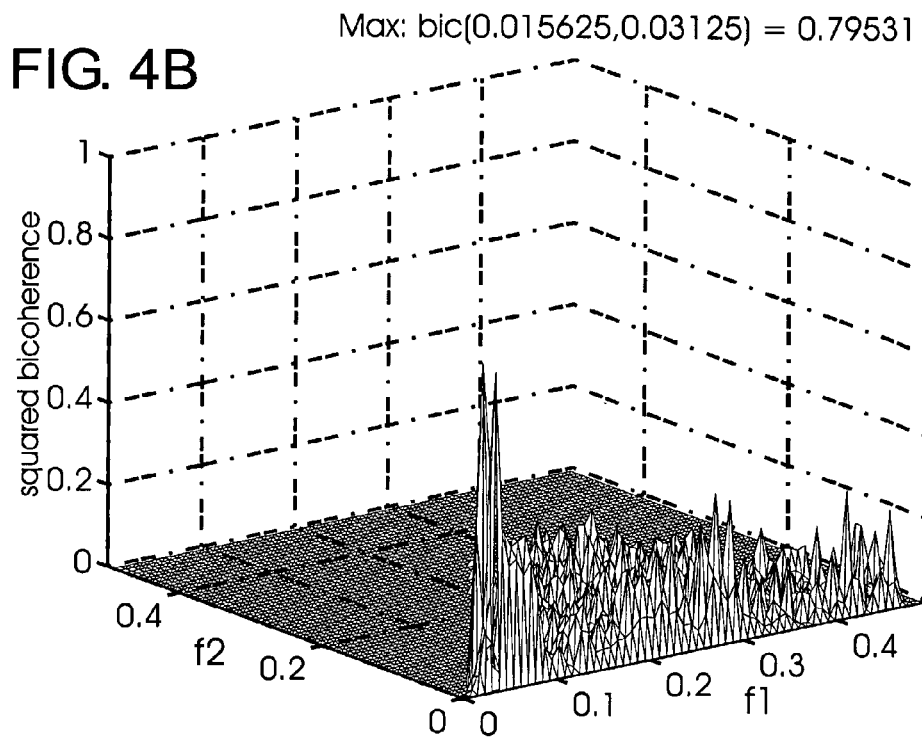
Figure 4C:
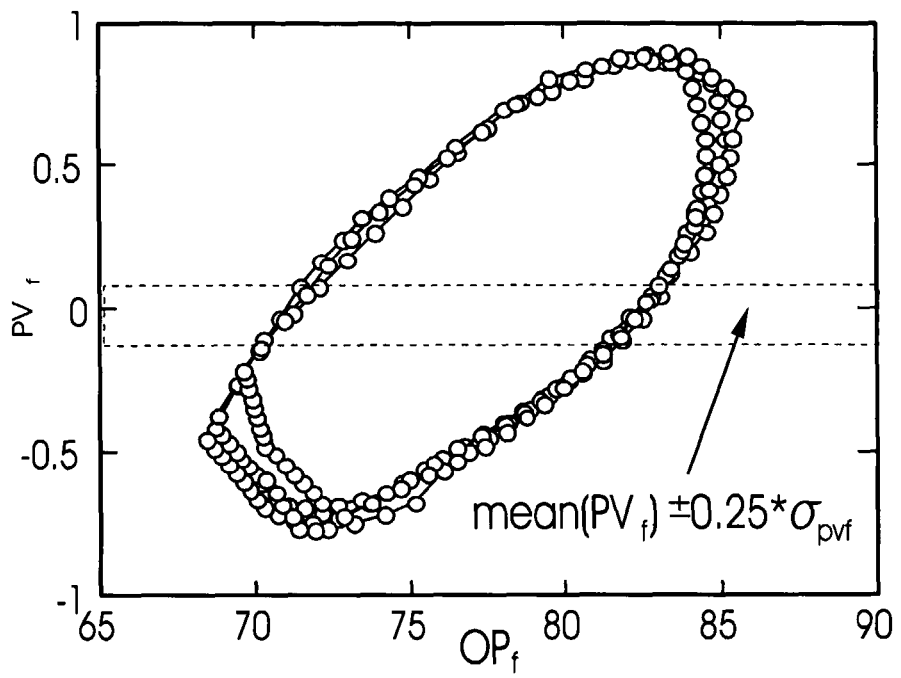
Figure 4D:
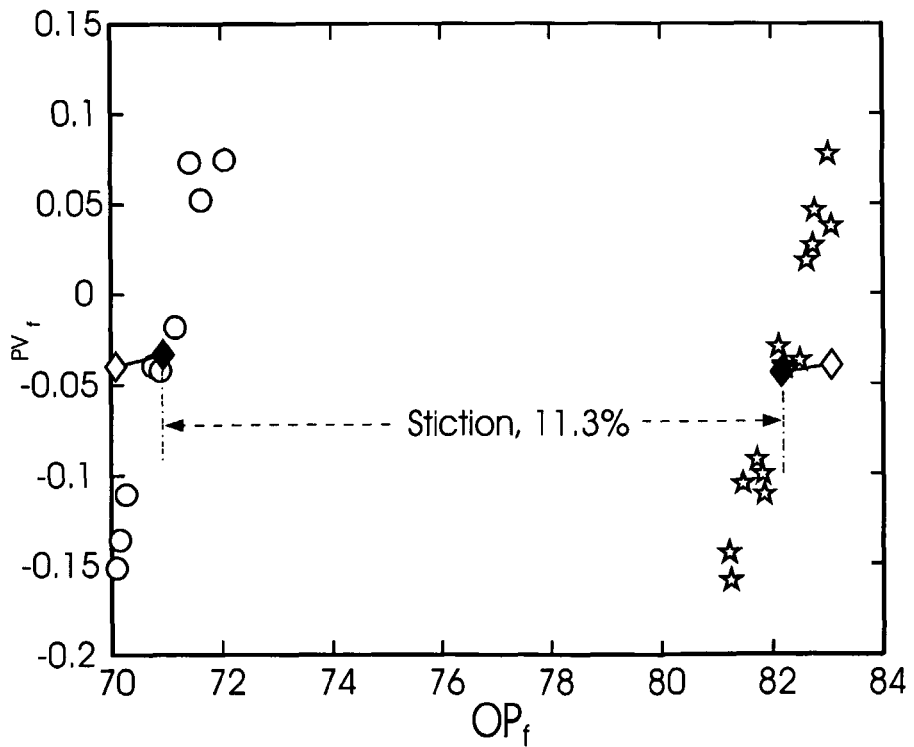
Figure 4E:
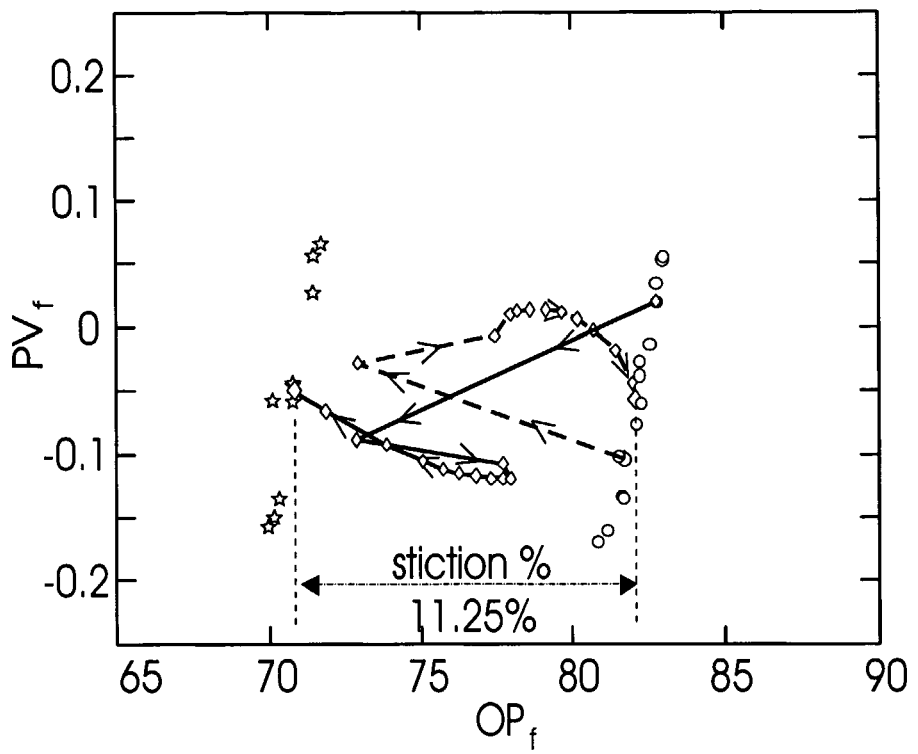
Figure 4F:
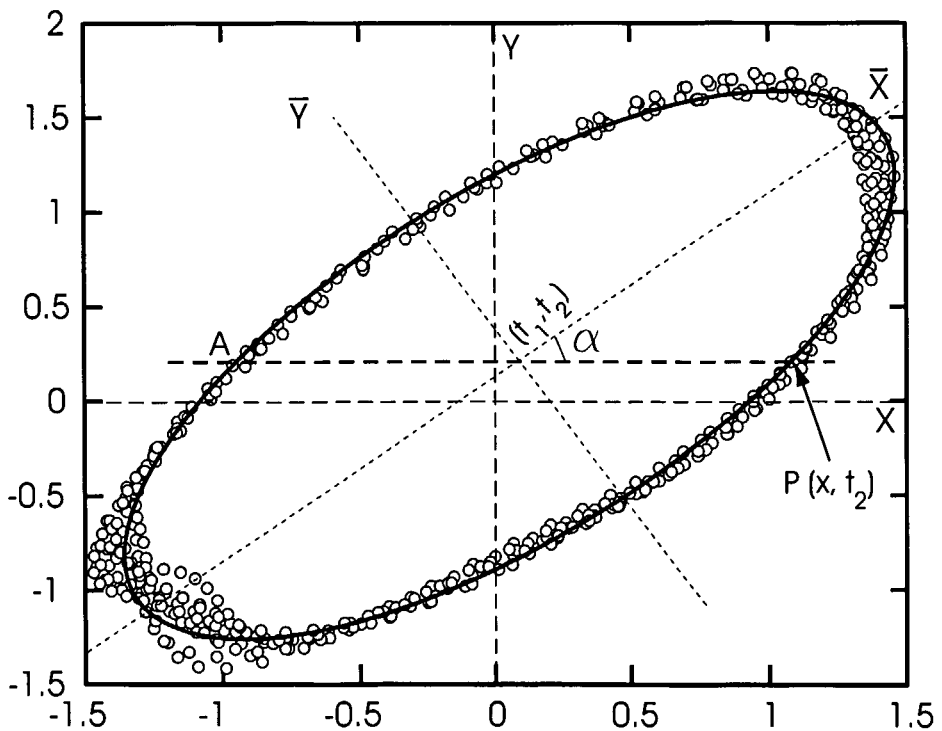

Since apparent stiction is defined as the maximum width of the ellipse in the op direction, the distance between two points lying on the intersections of the ellipse and a line parallel to the op axis and passing through the center of the ellipse will be the amount of apparent stiction present in the loop. For any point $P(x; t_2)$ in X-Y co-ordinate system as shown in FIG. 4(f) together with equations B-18 and B-19 can be used to solve equation B-16. This gives the X co-ordinates of points A and P (see FIG. 4(f)):

$$x = t_1 \pm \frac{mn}{\sqrt{(m^2 \sin^2\alpha + n^2 \cos^2\alpha)}} \qquad (7)$$

where $(t_1, t_2)$ is the center of the fitted ellipse (refer to FIG. 4(f)), m and n are the length of the major and minor axes of the fitted ellipse respectively, and $\alpha$ is the angle of rotation of the ellipse. Therefore, the amount of stiction (length of AP in FIG. 4(f)) can be obtained using the following expression $$\text{stiction} = AP = \Delta x = \frac{2mn}{\sqrt{(m^2 \sin^2\alpha + n^2 \cos^2\alpha)}} \qquad (8)$$

In one embodiment, the methods of the present invention may be automated. The following is the description of the automation steps.

1. Calculate NGI and NLI for the control error signal (sp-pv). If both of the indices are greater than 0, then go to the following step. Otherwise, if both indices are not greater than 0, the non-linearity is not a problem. The poor performance may be caused by a tightly tuned controller, a detuned controller or an external oscillatory disturbance(s) (refer to FIG. 2).

2. Once the non-linearity is detected, obtain the frequency pair ($f_1$, $f_2$) corresponding to the maximum bicoherence peak in step 1. Note that all frequencies are normalized such that the sampling frequency is 1. Define $f'_1 = \min(f_1, f_2)$ and $f'_2 = \max(f_1, f_2)$.

3. The boundaries of a frequency domain filter (e.g., a Wiener filter) can be obtained from $[\omega_L = \max(0.004, f'_1 - 0.05), \omega_H = \min(0.5, f'_2 + 0.05)]$. Note that 0.05 is subtracted or added from the frequencies in order to ensure that the exact location of the significant peak does not fall on the filter boundaries. A different bound other than ±0.05 can also be used.

4. Filter pv and op data to obtain $pv_f$ and $op_f$.

5. Obtain the segment of the data with regular oscillations:
   a. Choose the segment length L, for example L=1000.
   b. Divide the $op_f$ data into segments of length L. Here $op_f$ is chosen instead of $pv_f$ because often op signal is less noisy than pv signal.
   c. Calculate r and $T_p$ for each segment of $op_f$ data.
   d. Obtain $r_{max} = \max(r)$.
   e. Obtain $T_{ps}$, which is equal to the $T_p$ of the segment of op with $r_{max}$.
   f. If $L > 5\,T_{ps}$, then choose $L = 5\,T_{ps}$ and go to step b.
   g. Now, $op_{fs}$ is the segment of the $op_f$ data that corresponds to the $r_{max}$ and $pv_{fs}$ is the part of the $pv_f$ data that corresponds to $op_{fs}$.

6. Use the $pv_{fs}$ and $op_{fs}$ data to get $pv_f$ vs. $op_f$ relationship.

7. Fit a conic to the selected $pv_{fs}$ and $op_{fs}$ data. If both eigenvalues of the A matrix are greater than zero and $\bar{c} > 0$, then the $pv_f$ vs. $op_f$ plot is an ellipse. Otherwise the plot does not fit to an ellipse and the cause of the non-linearity is not stiction.

8. Quantify stiction using Formula 8. The clustering techniques, based on Formula 6, can also be used to quantify stiction.

Figure 2:
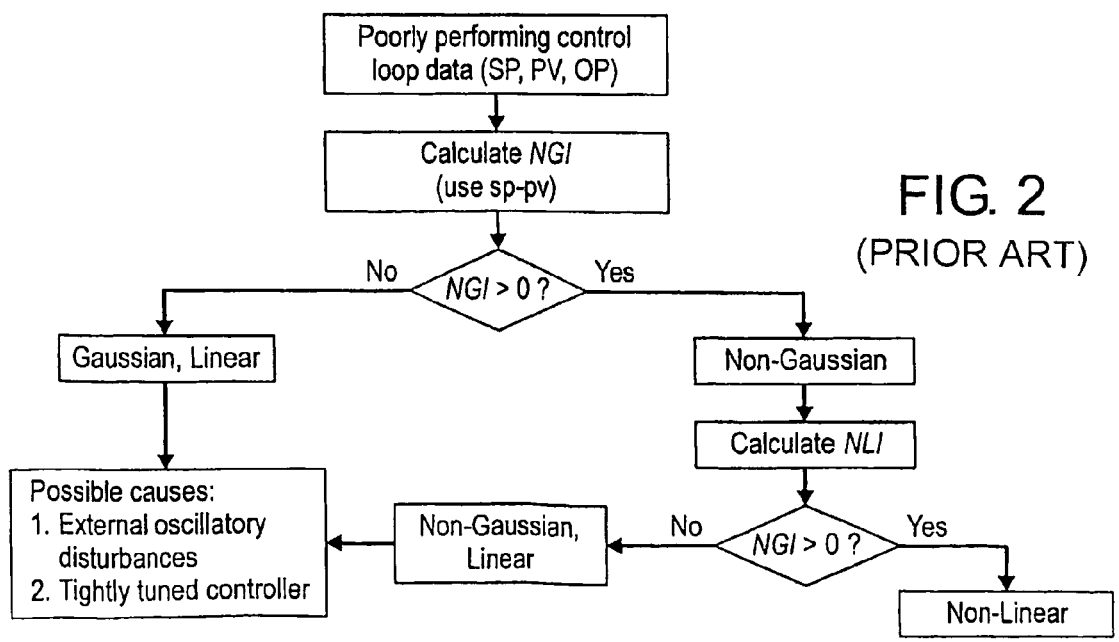
FIG. 2 is a decision flow diagram of the methodology for the detection and diagnosis of loop non-linearity.
Figure 3:
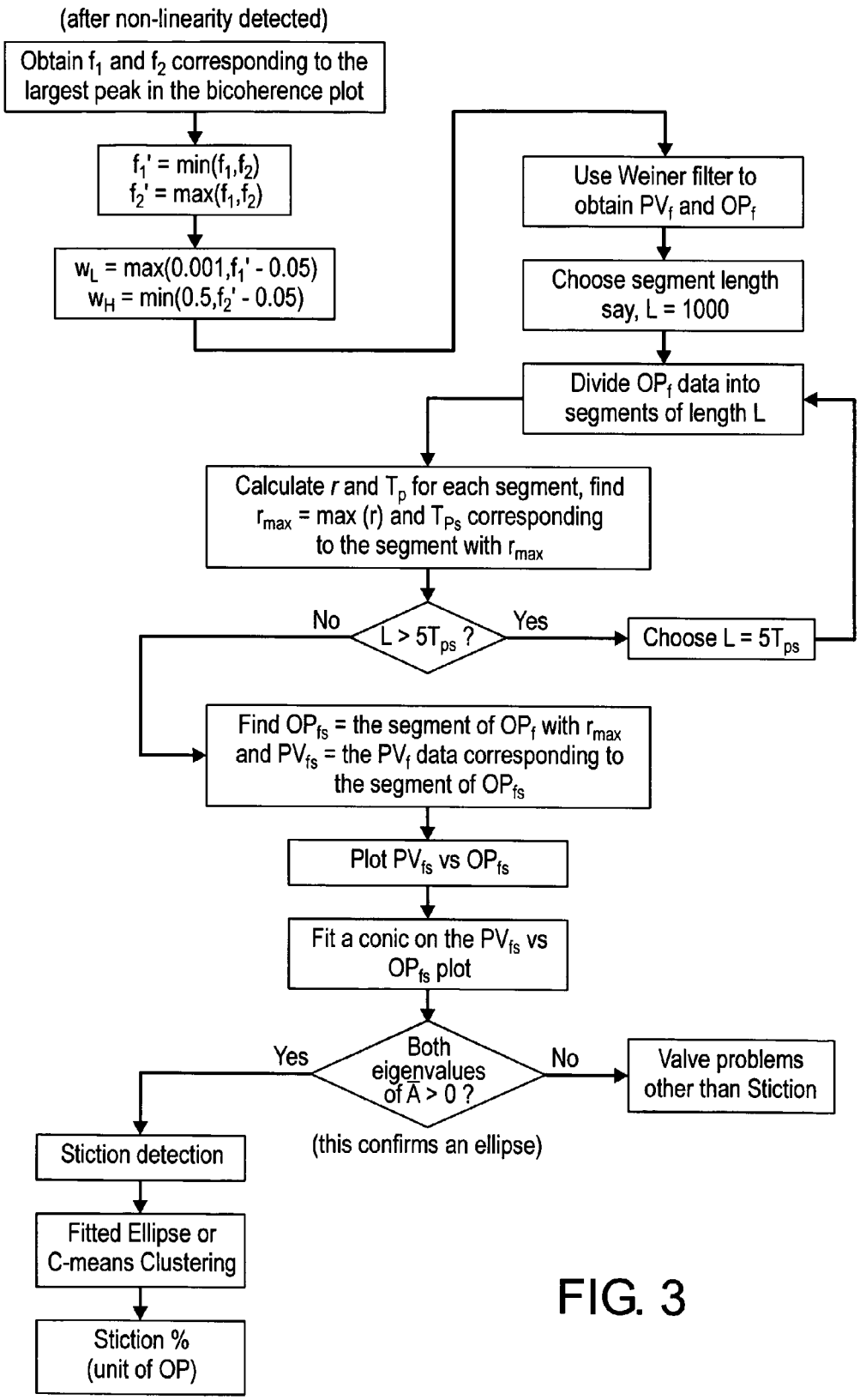
FIG. 3 is a decision flow diagram of the methodology for the detection and quantification of valve stiction.

The above mentioned automatic detection and quantification of stiction algorithm are shown schematically in FIGS. 2 and 3. FIG. 2 shows the automatic detection of loop non-linearity. Once the non-linearity is detected, the methodology shown in FIG. 3 can be used to quantify stiction.

As will be apparent to those skilled in the art, various modifications, adaptations and variations of the specific disclosure within can be made without departing from the scope of the invention claimed herein. The various features and elements of the described invention may be combined in a manner different from the combinations described or claimed herein, without departing from the scope of the invention.

EXAMPLES

The following examples are provided only to illustrate the present invention, not to limit the claimed invention.

Example 1

A first example represents a level control loop in a power plant, which controls the level in a condenser located at the outlet of a turbine by manipulating the flow rate of the liquid condensate from the condenser. In total 8640 samples for each tag were collected at a sampling rate of 5 s. FIG. 4(a) shows the time trends for level (pv), set point (sp) and the controller output (op). The loop shows oscillatory behavior. 4096 data points were used for the bicoherence calculation and FIG. 4(b) shows the squared bicoherence plot corresponding to the controller error signal (sp-pv). The values of NGI and NLI were found to be 0.04 and 0.61, respectively, indicating the presence of significant loop non-linearity. From the bicoherence plot in FIG. 4(b), it can be found that frequencies in the range 0.001 to 0.1 are the most significant frequencies of the signal that are responsible for non-linear interactions. Therefore, the pv and op signals were filtered using a Wiener filter with frequency boundaries at 0.001 and 0.1. Using the method of Thornhill et al. (2003) described earlier, it was found that the controller output signal was showing a regular oscillation with an average period of 19.78 sampling instants and the maximum r value 10.5 for a segment length of 200 data points. The maximum r value corresponds to the 2801 to 3000 samples. To isolate the non-linearity, the $pv_f$-$op_f$ plot is found to be useful. So, the filtered $pv_f$ and $op_f$ corresponding to this segment is plotted in FIG. 4(c), which shows elliptical patterns indicating valve stiction. FIG. 4(d) demonstrates the C-means clustering technique used in the quantification of stiction. The points denoted with empty and filled diamonds are the initial and final centers of the clusters, respectively. This method quantifies the amount of stiction in this loop as 11.3%. On the other hand, FIG. 4(e) shows the use of fuzzy c-means clustering in the quantification of stiction. The trajectories followed by the centers of the clusters during the iteration stages are shown by lines with diamonds directed with arrows. The final centers are again in solid diamonds. The amount of stiction estimated by this method is 11.25%. FIG. 4(f) shows the algebraic ellipse fitting technique and the amount of stiction estimated using this method is 11.40%. All three methods have produced substantially identical results with practically tolerable limits of deviation from each other.

Figure 5:
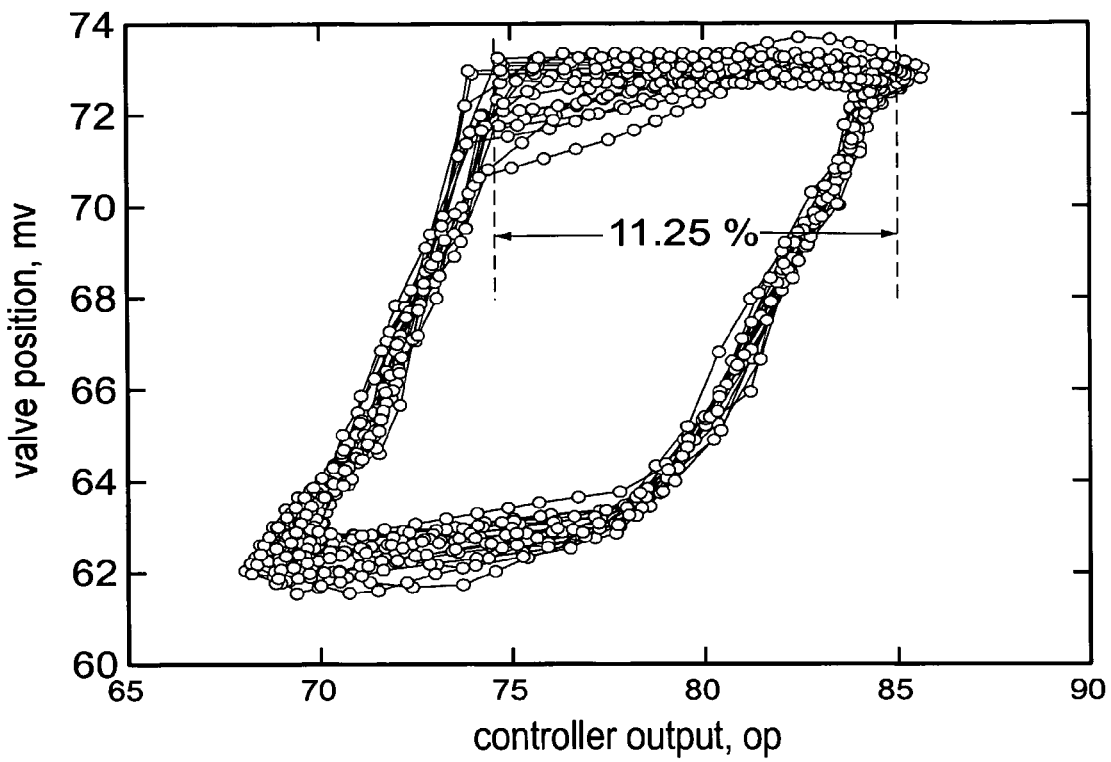
FIG. 5 is a Valve Position (mv) versus Controller Output (op) plot which validates the findings in FIG. 4.

The results of this example were compared for validation purposes to the valve positioner data available for this loop. FIG. 5 shows the actual valve position (mv) vs. controller output (op) plot. This plot clearly shows that the valve was sticking during the change of its direction. From this plot, the amount of stiction can be estimated as 11.25% which is in agreement with the results obtained from the proposed methods.

Example 2

Figure 6:
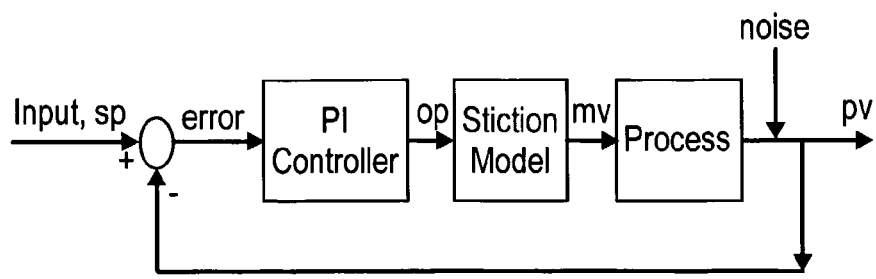
FIG. 6 is a block diagram of a simple SISO process with stiction non-linearity in the valve.
Figure 7A:
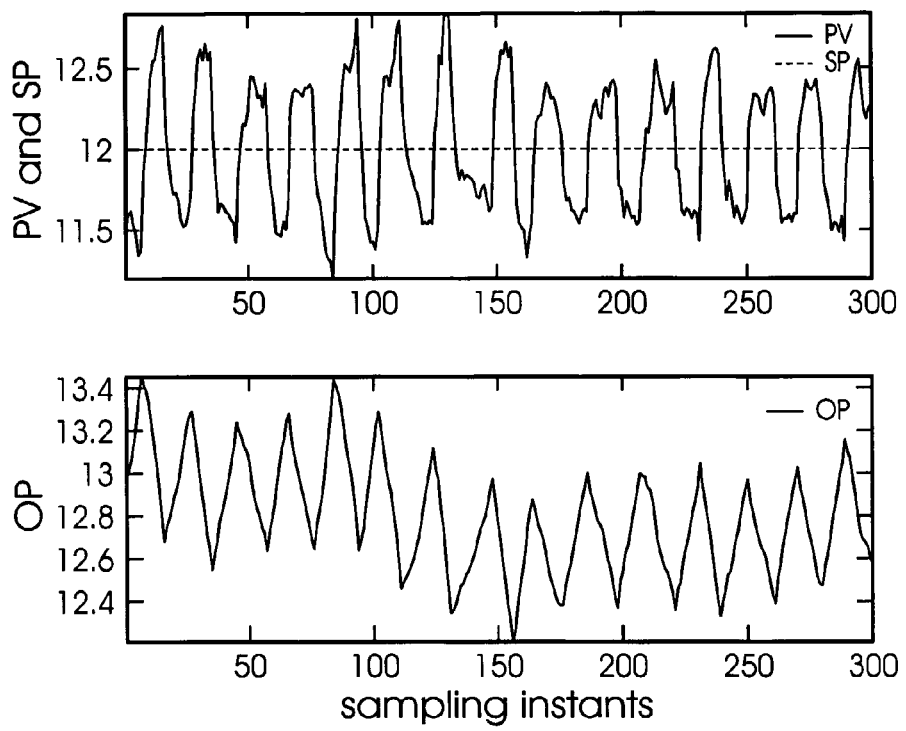
FIGS. 7(a)-7(e) show the results of the simulation data analysis.
Figure 7B:
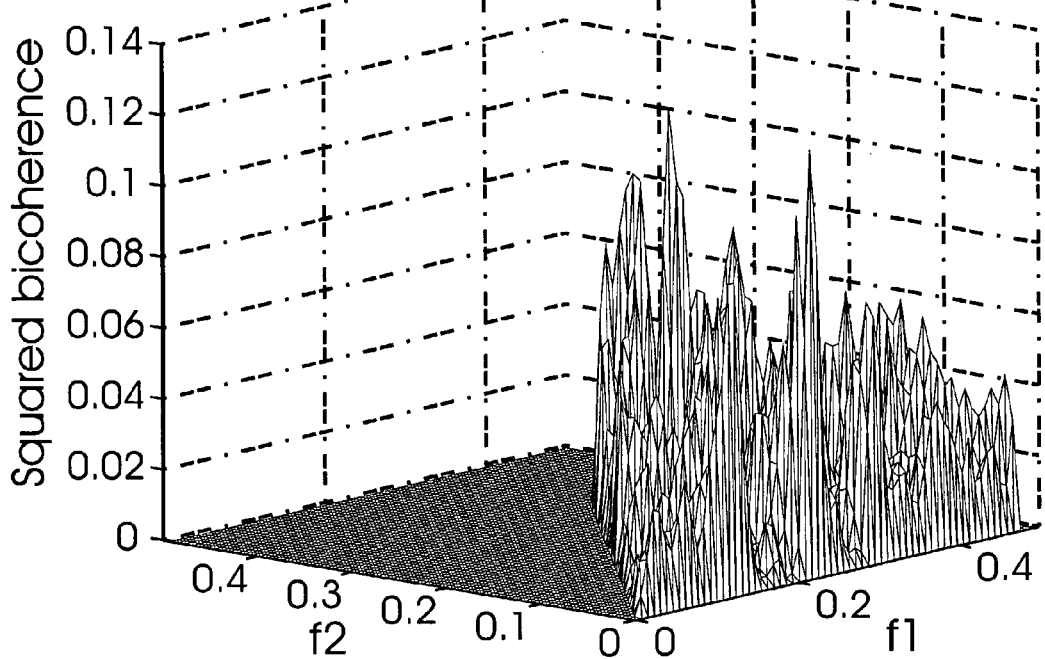
Figure 7C:
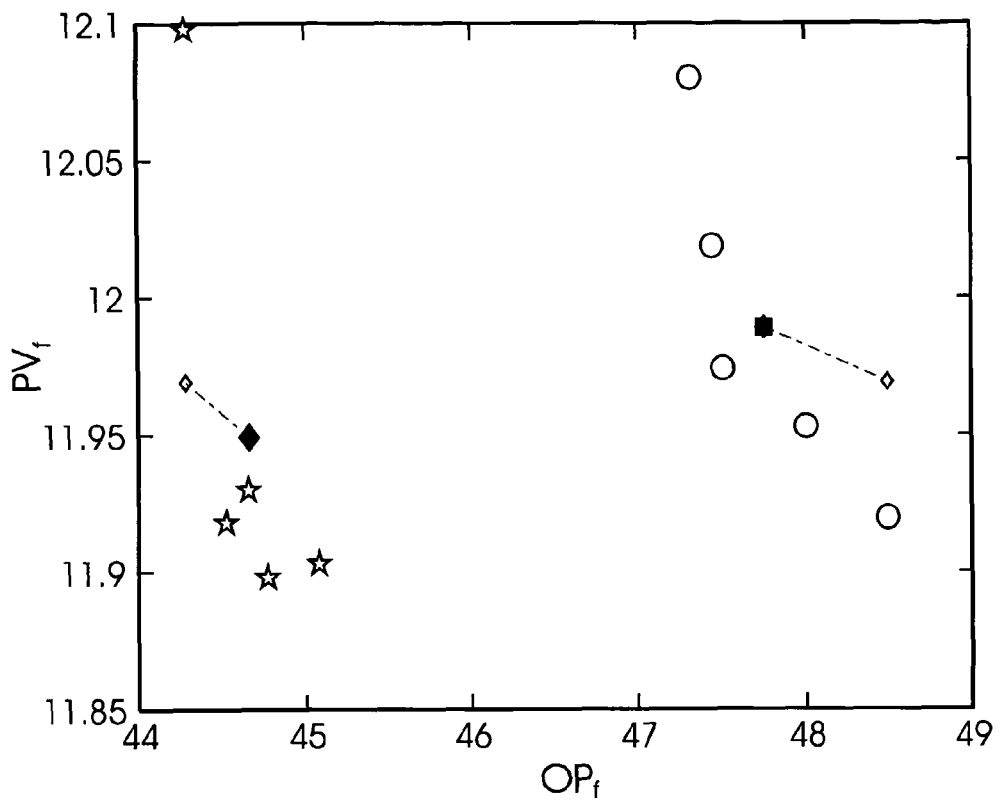
Figure 7D:
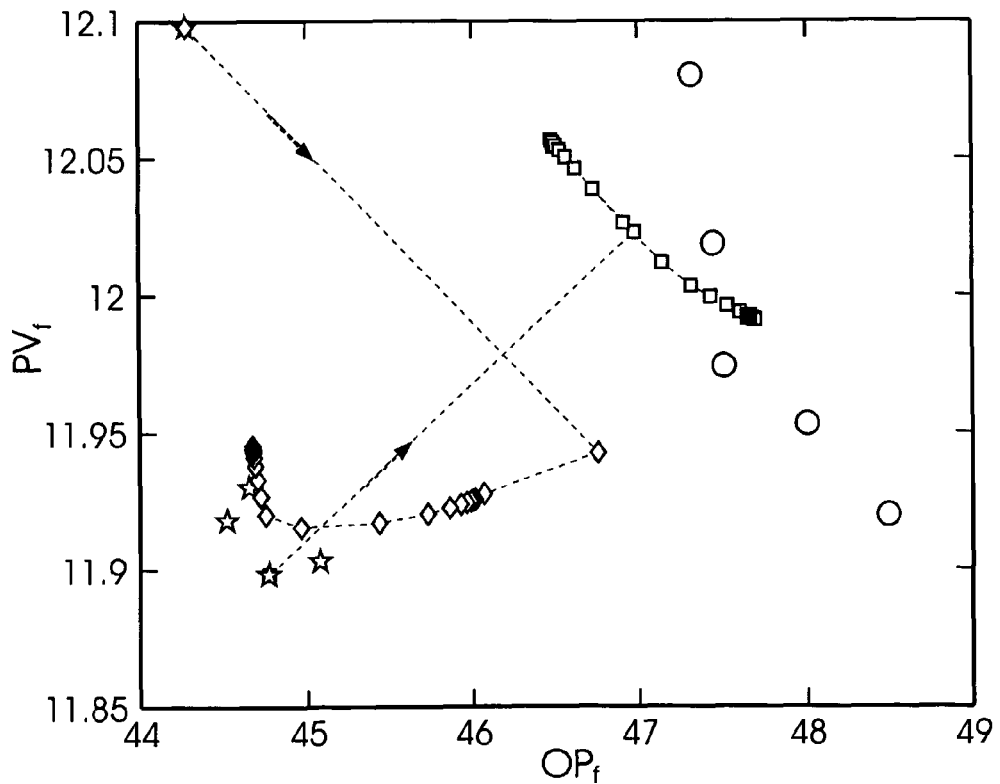
Figure 7E:
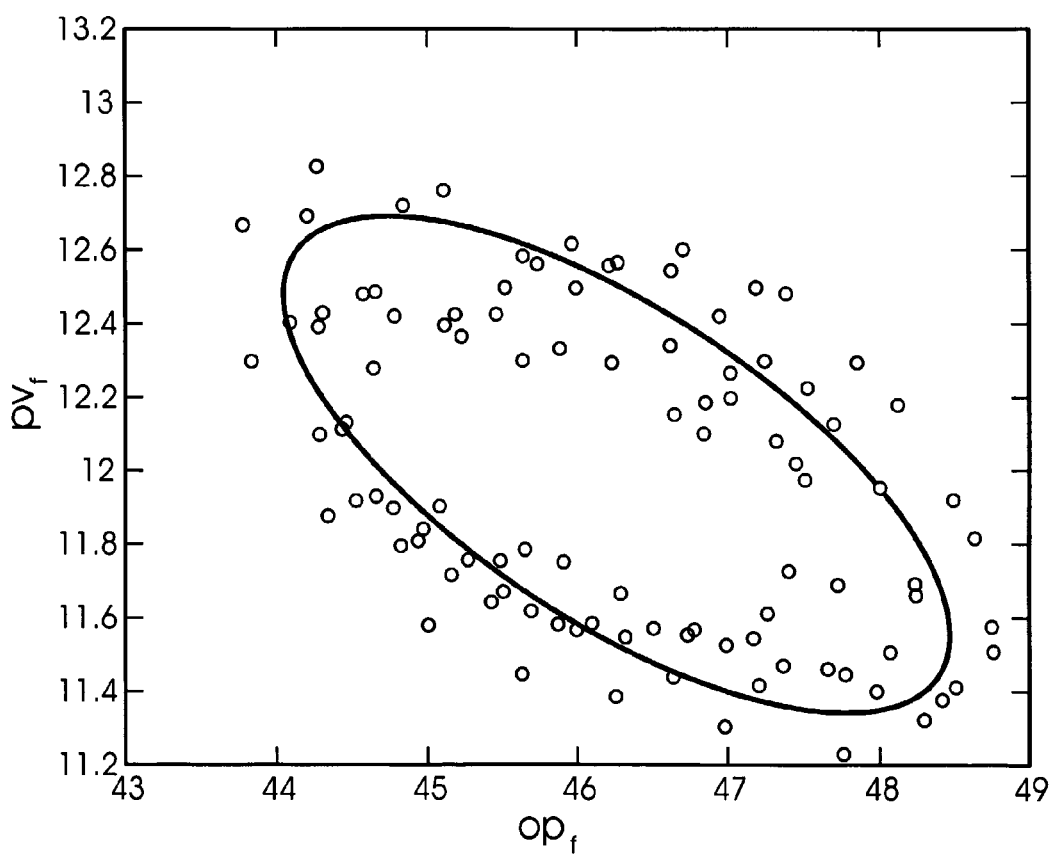

The applicability of the methods of the present invention for the detection and quantification of valve stiction were demonstrated by simulation through a known simulated case of stiction. A simple single-input, single-output (SISO) system in a feedback control configuration (FIG. 6) was used for generating simulated data. The first order process with time delay is given by the following transfer function:

$$G(z^{-1}) = \frac{z^{-3}(1.45 - z^{-1})}{1 - 0.8 z^{-1}} \qquad (9)$$

The process is operating under regulatory control with a PI controller. A random walk disturbance generated by passing random noise through an integrator was added to the process. The signal to noise ratio defined by the ratio of the variance of the controlled output (pv) to the variance of the random noise was 6. The simulation was performed for 6000 sampling intervals. To remove the effect of transients, the first few hundred data points were discarded and the last 4096 points of the error signal to the controller (sp-pv) were analyzed to detect the non-linearity present in the system.

A stiction model developed by (Choudhury et al., 2004a; Choudhury et al., 2005) was used to introduce the stiction behavior of the control valve in the closed loop process. A 3% stiction ('S') with 1% slip jump ('J') were used in simulation. In order to initiate limit cycles or oscillations in a simple first order time delay process in presence of valve stiction, a set point change at the beginning of simulation is used. Then the process is left to operate under regulatory control. FIG. 7(*a*) shows the time trends of pv, op, and sp. The presence of stiction produces oscillations in the process. The values of NGI and NLI are 0.01 and 0.06, clearly detecting the presence of non-linearity in the process signal. The bicoherence plot (FIG. 7(*b*)) shows that the frequency range of interest from the non-linearity point of view is [0.001 0.28] (using the steps of automation section). After performing Wiener filtering, the segments of the $pv_f$ and $op_f$ data corresponding to the segment of $op_f$ that has highest oscillation index were chosen to obtain the $pv_f$-$op_f$ plot. C-means clustering, fuzzy c-means clustering and fitted ellipse technique were used to quantify stiction. The amount of stiction obtained from these techniques were estimated to be 2.98%, 2.98% and 3.2% respectively, which are more or less the same as the amount of stiction used during simulation. Thus, all these methods are capable of correctly quantifying the amount of stiction present in a control loop.

Example 3

Figure 8A:
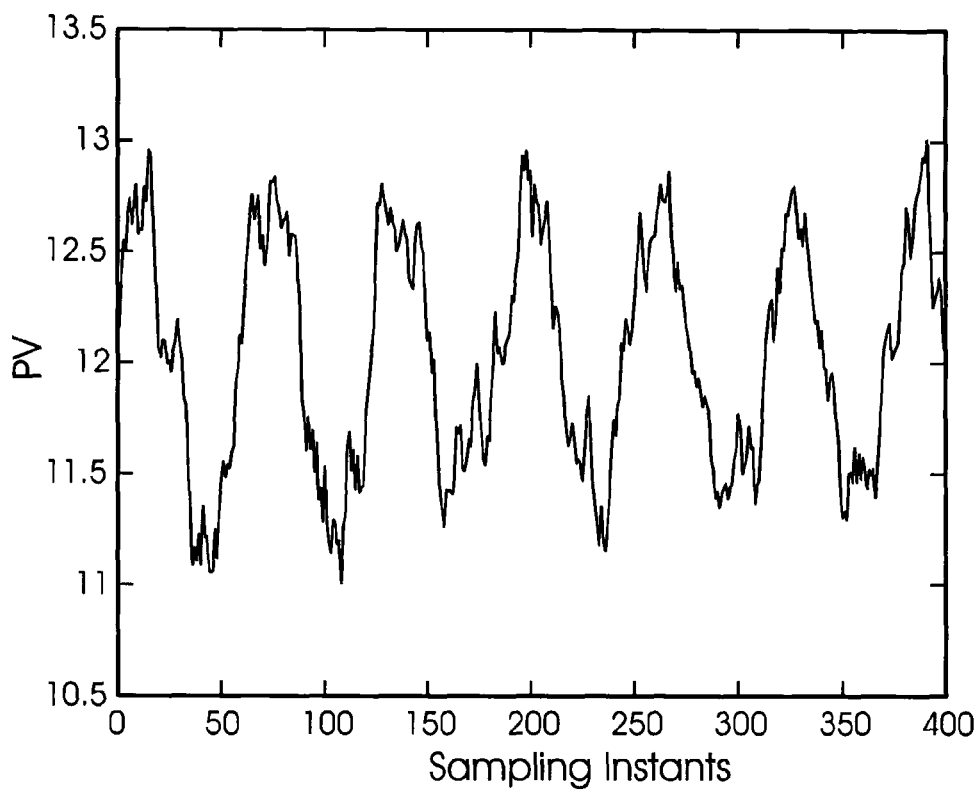
FIGS. 8(a)-8(c) show the simulation results in the presence of an external oscillatory disturbance.
Figure 8B:
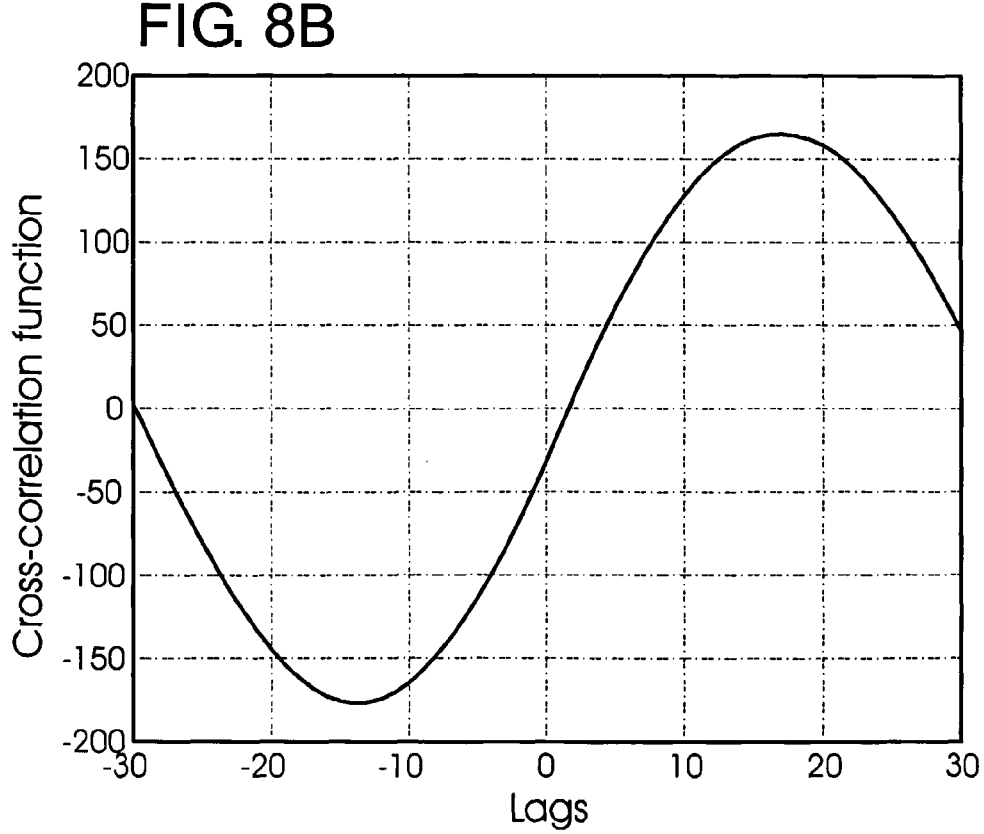
Figure 8C:
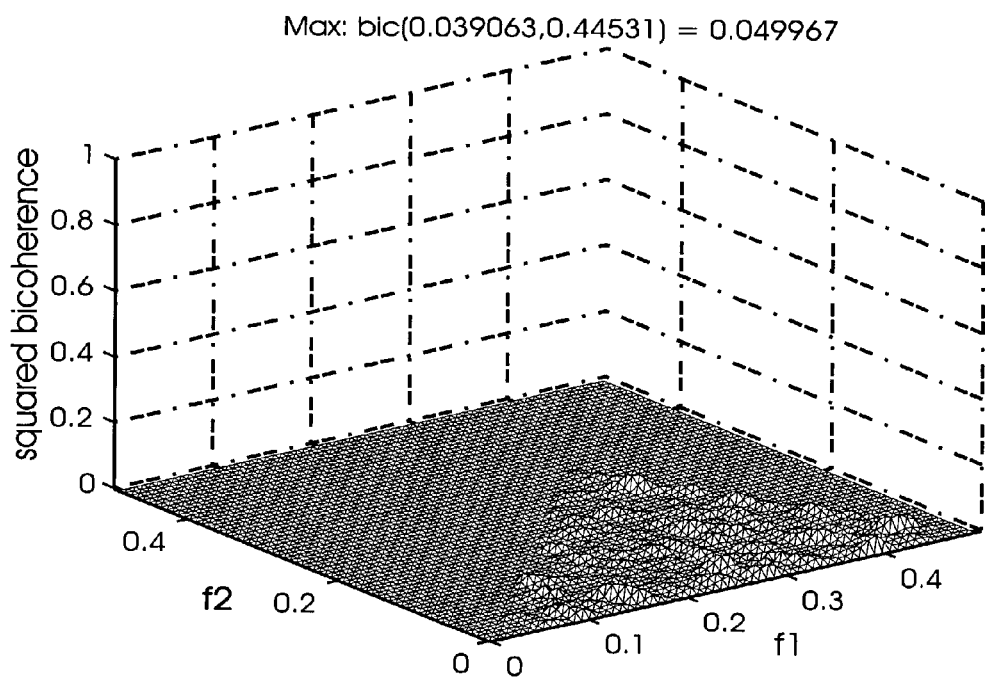

Often times an unmeasured oscillatory disturbance, for example a sine wave, can initiate cycles in the controlled and manipulated variables and can often be misdiagnosed as a valve problem. This example illustrates the effect of a sinusoidal disturbance with amplitude 2 and frequency 0.01 when added to the process in addition to the noise (refer to FIG. 6). The stiction model was not used in the loop. So, the diagnosis results should show that there is no stiction or any other non-linearity. The time trend of the controlled variable (pv) in FIG. 8(*a*) shows the oscillatory behavior of the process output. Horch's cross-correlation test (Horch, 1999) shows an odd correlation function indicating possible valve stiction (see FIG. 8(*b*)). However, the higher order statistical test developed here shows that NGI equals 0 indicating a linear loop. The bicoherence plot for the error signal to the controller is shown in FIG. 8(*c*). The flatness of the bicoherence plot confirms the linearity of the loop.

Example 4

The methods of the present invention were evaluated on a number of selected control loop data obtained from different types of process industries. For each loop, the set point (sp), controlled output (pv) and controller output (op) data were available. Unless otherwise stated, a data length of 4096 was used for the squared bicoherence calculation for each case. The time trends of these variables, the squared bicoherence plot, the c-means clustering plot, and the fitted ellipse plot for each loop are presented. The numerical results for all loops are provided in Table 1 (below). These data were analyzed before the prior knowledge of the control valve problems and the results of the analysis were confirmed upon communication with the plant personnel. Since both C-means and fuzzy C-means clustering are similar methods, for the sake of brevity, only results using C-means clustering technique are reported here.

Example 4.1

A Level Loop

Figure 9C:
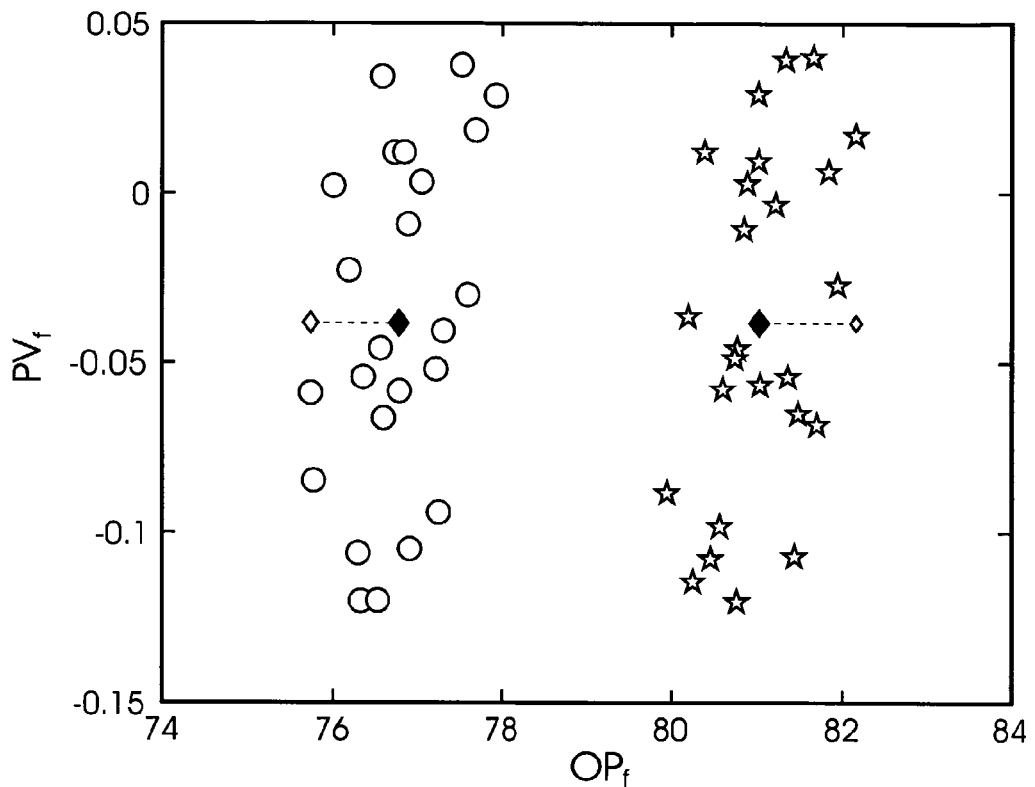
Figure 9D:
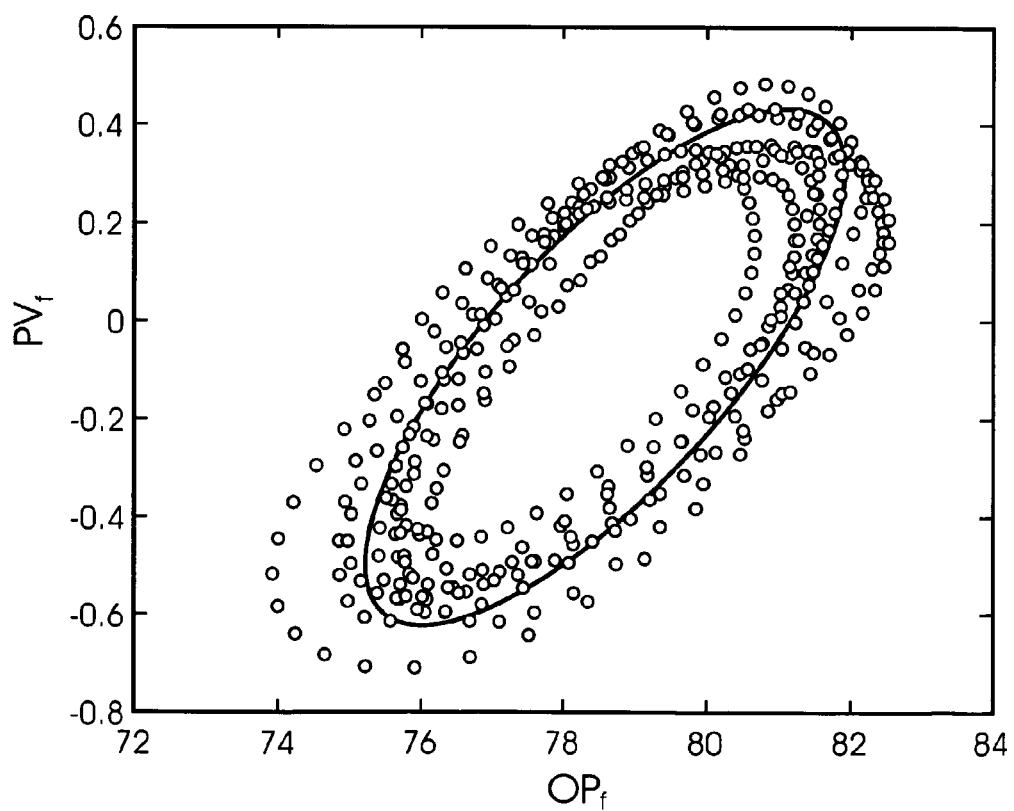

This is a level control loop in the same power plant described above in Example 1. It also controls the level of condensers located at the outlet of a turbine by manipulating the flow rate of the liquid condensate. FIG. 9(*a*) shows the time trend of the sp, pv, and op data. FIG. 9(*b*) shows the squared bicoherence plot. The values of NGI and NLI were 0.1 and 0.40. These clearly indicate that non-linearity is a problem for this loop. From the position of the maximum peak at the bicoherence plot, the frequency range for the Wiener filter was obtained following the steps described in the automation section. The frequency band for the filter is [0.001 0.08] (1000 samples/cycle to 12.5 samples/cycle). The average period of oscillation(s) was 50 samples for the controller output signal. The segment of the data corresponding to the maximum oscillation index (the magnitude of r was 22 for this case) was selected to quantify stiction. Both c-means clustering and fitted ellipse techniques provide the amount of apparent stiction as 4%. The c-means clustering plot is shown in FIG. 9(*c*) while FIG. 9(*d*) shows the fitted ellipse technique for quantifying stiction.

Example 4.2

A Linear Level Control Loop

Figure 10A:
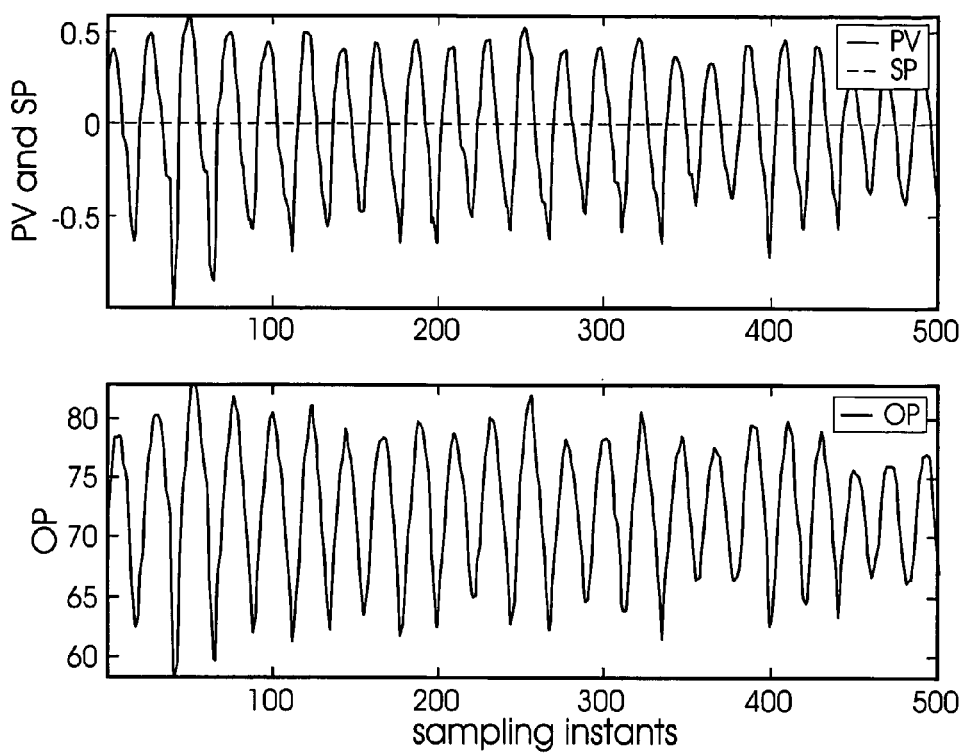
FIGS. 10(a)-10(c) show the results of the analysis of a linear level control loop.
Figure 10B:
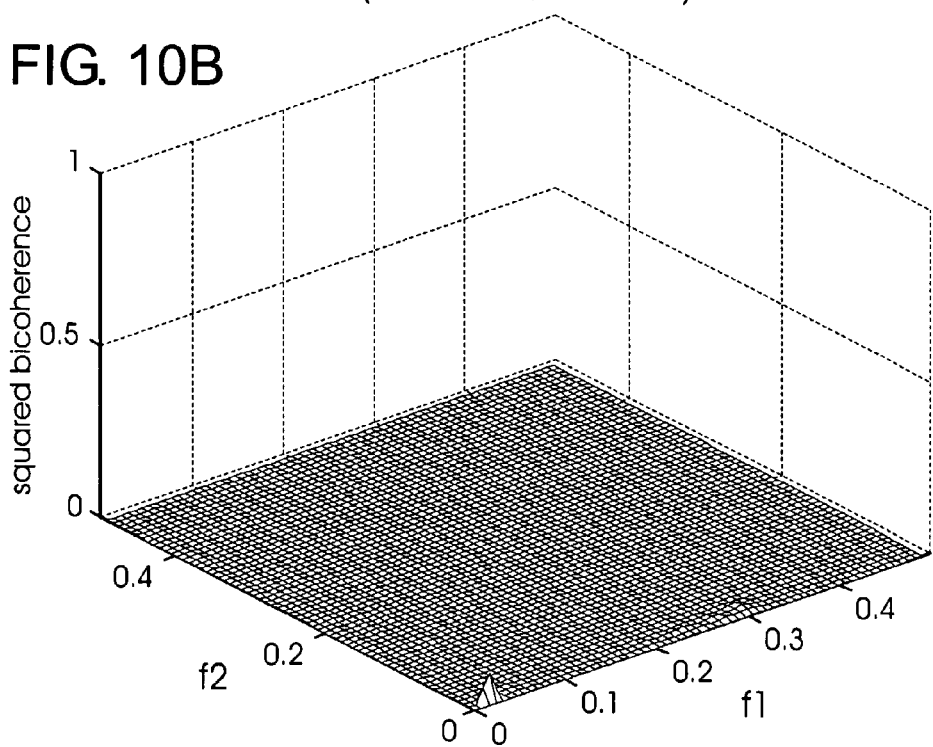
Figure 10C:
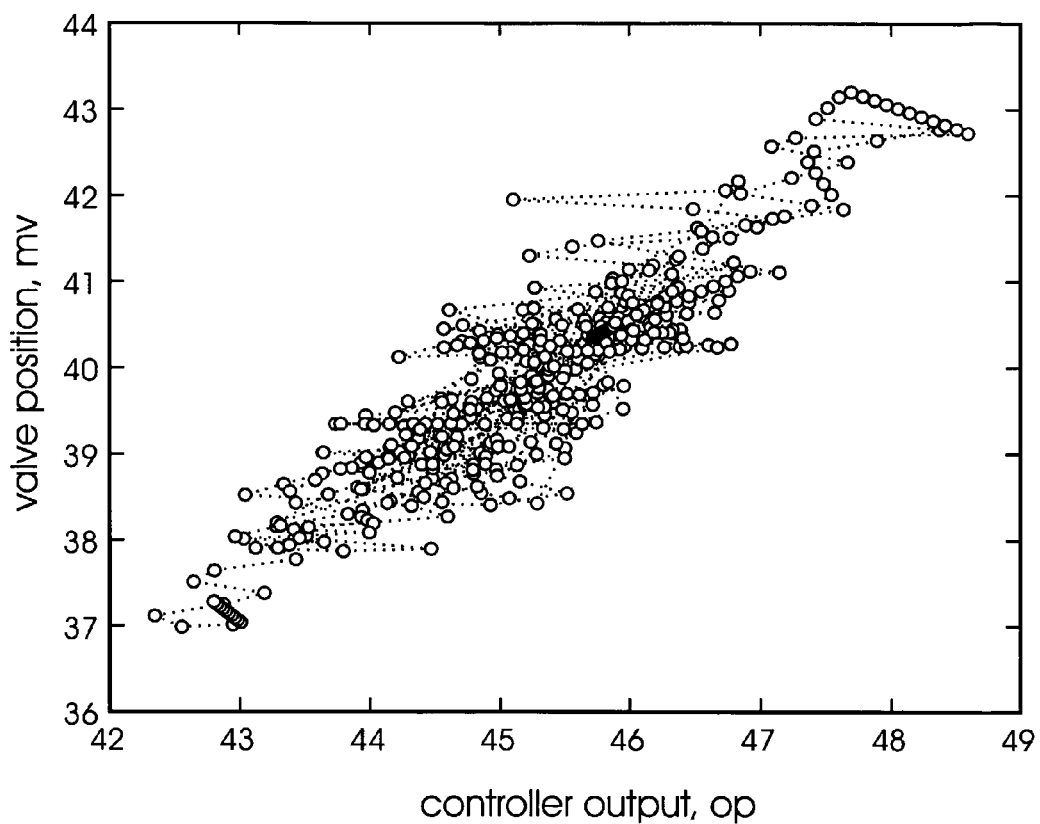
Figure 11A:
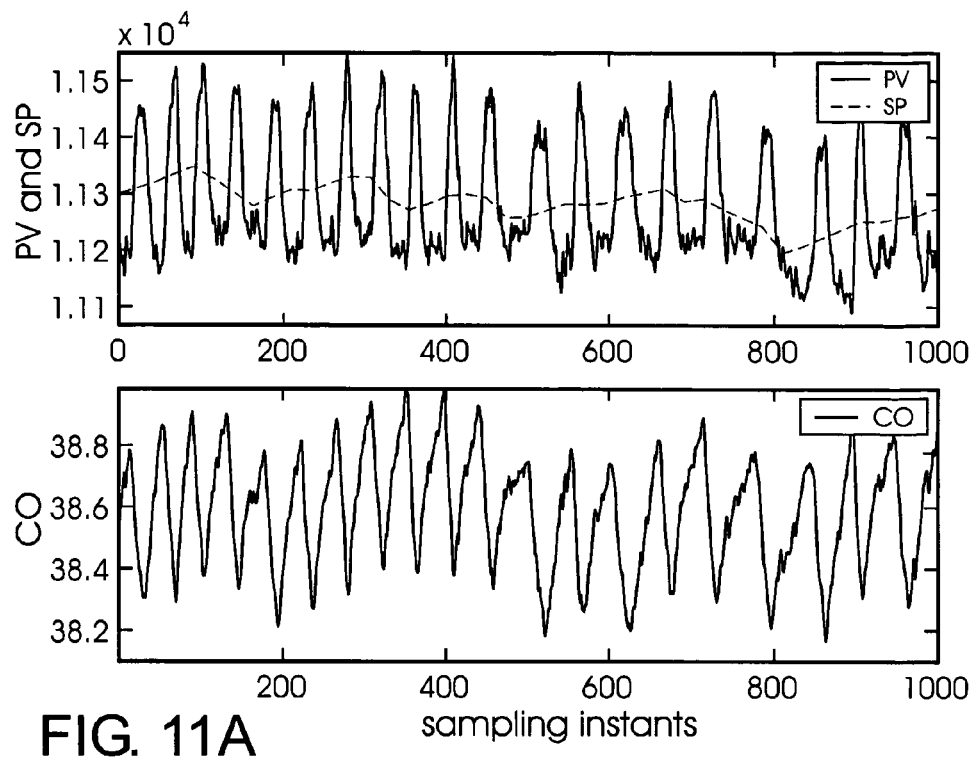
FIGS. 11(a)-11(d) show the results of the analysis of a refinery flow control loop.
Figure 11B:
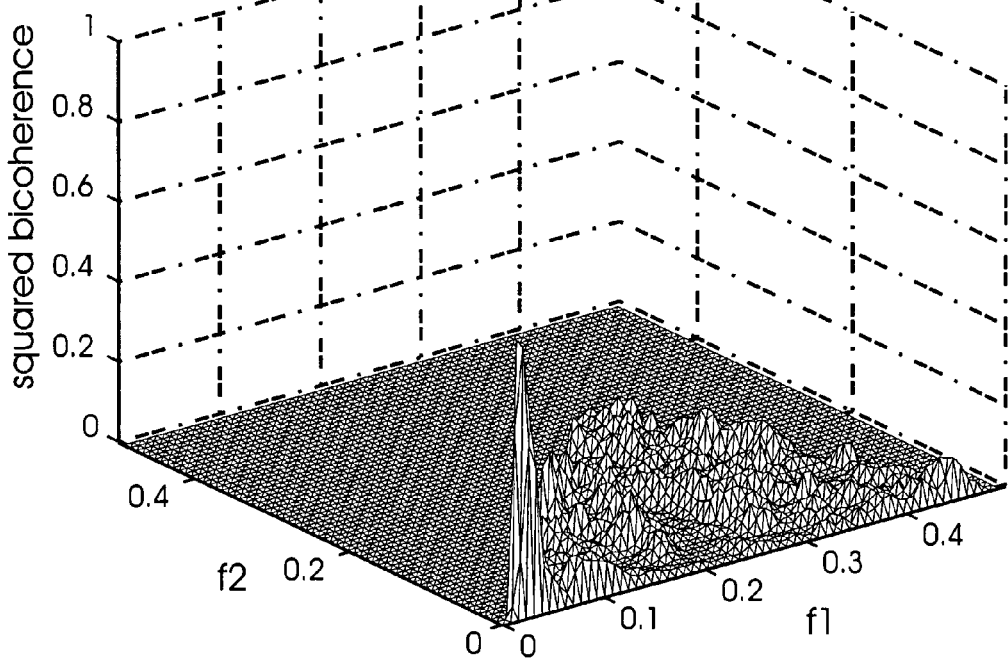
Figure 11C:
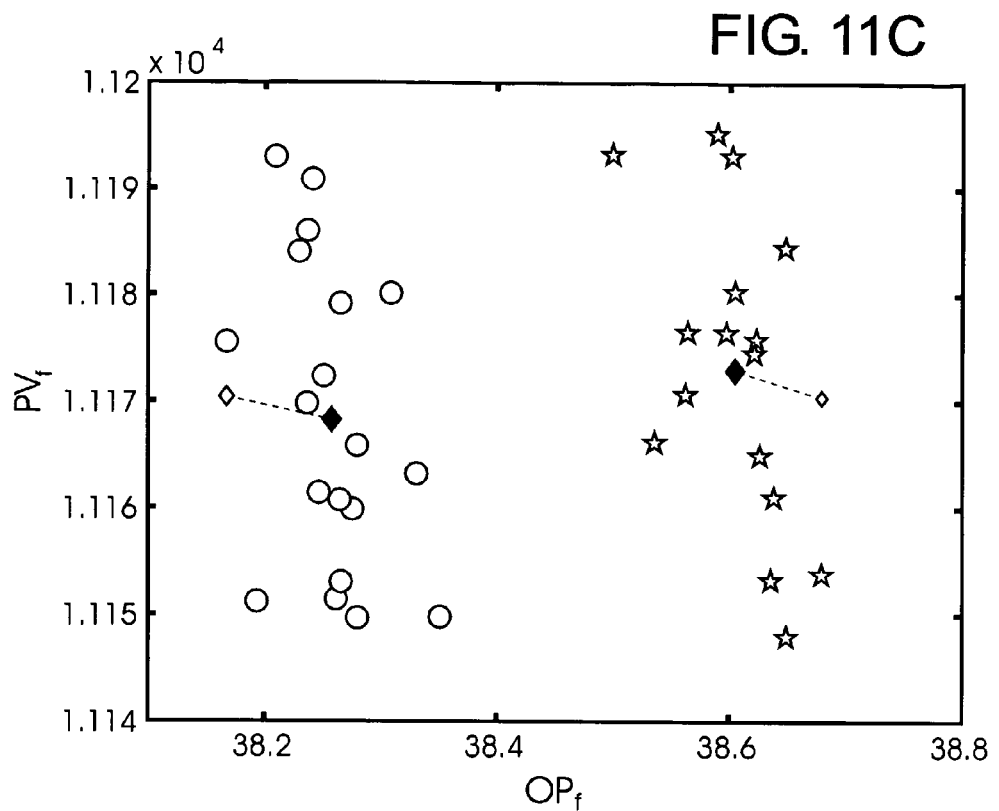
Figure 11D:
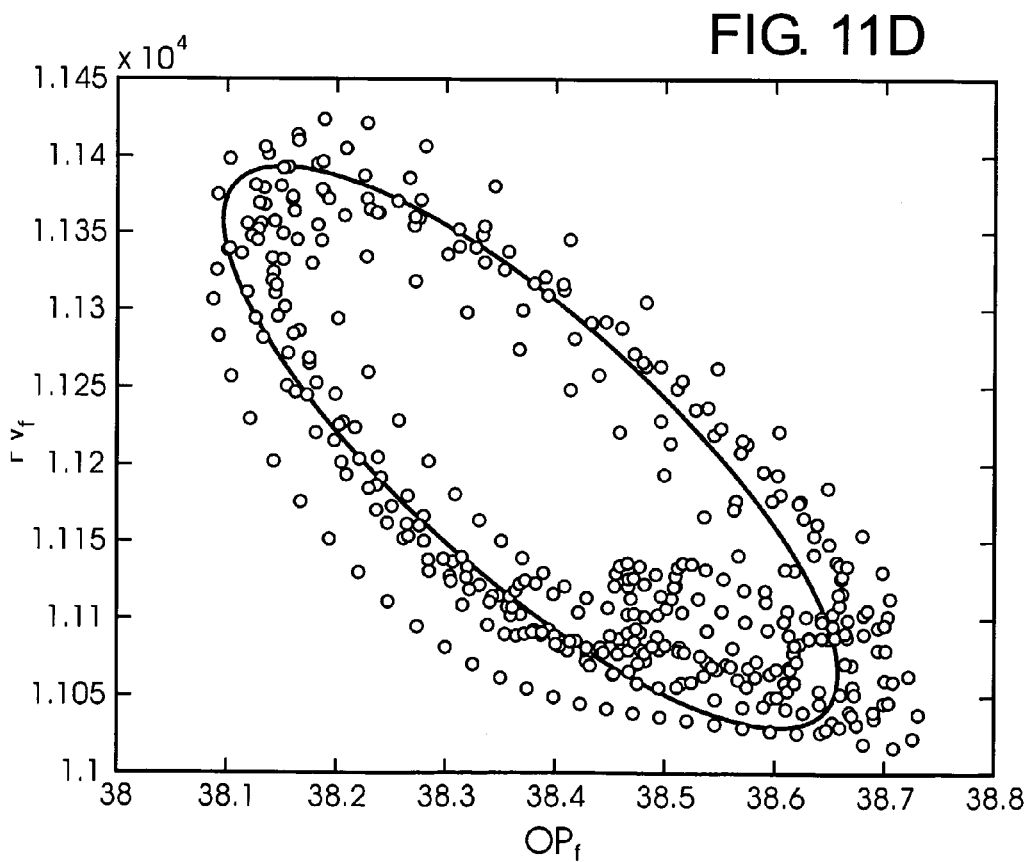
Figure 12A:
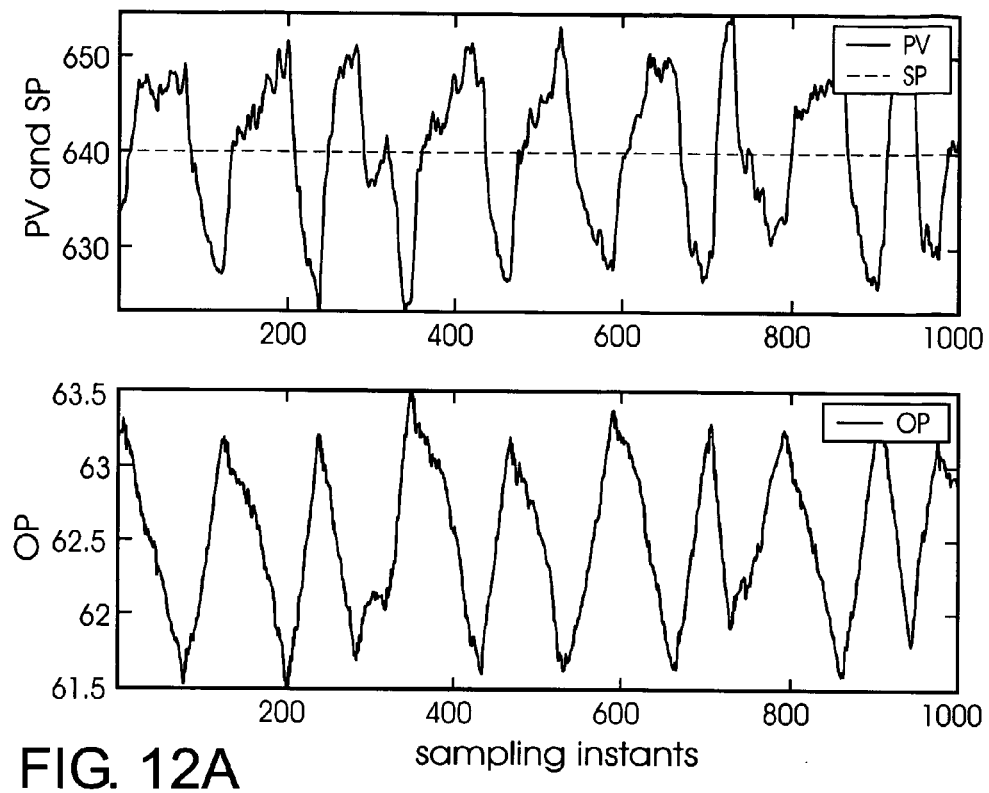
FIGS. 12(a)-12(d) show the results of the analysis of a furnace dryer temperature control loop.
Figure 12B:
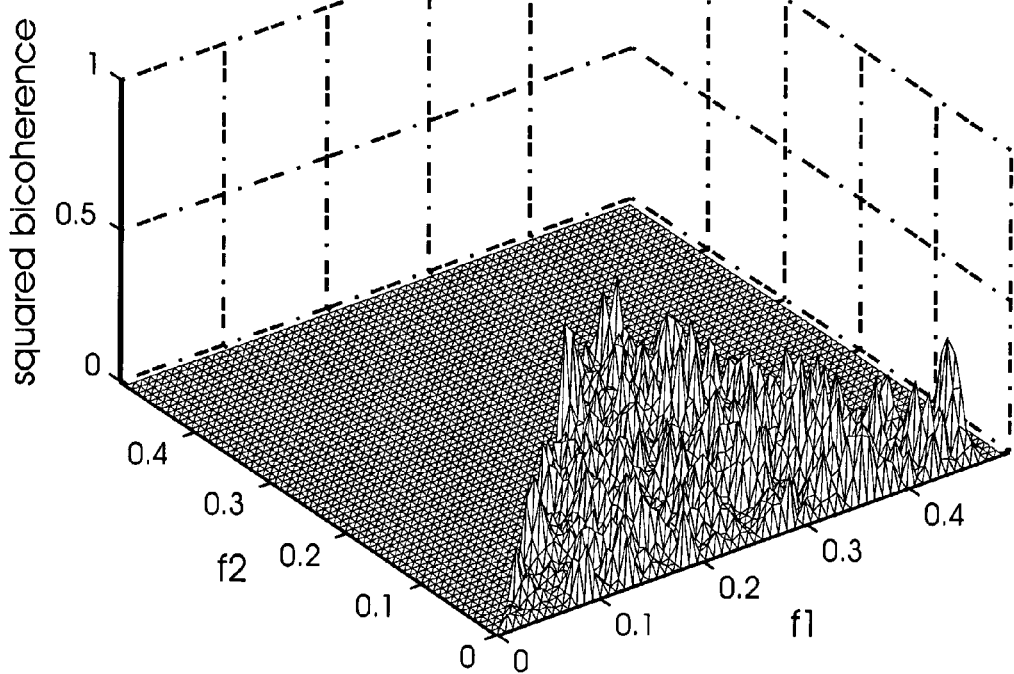
Figure 12C:
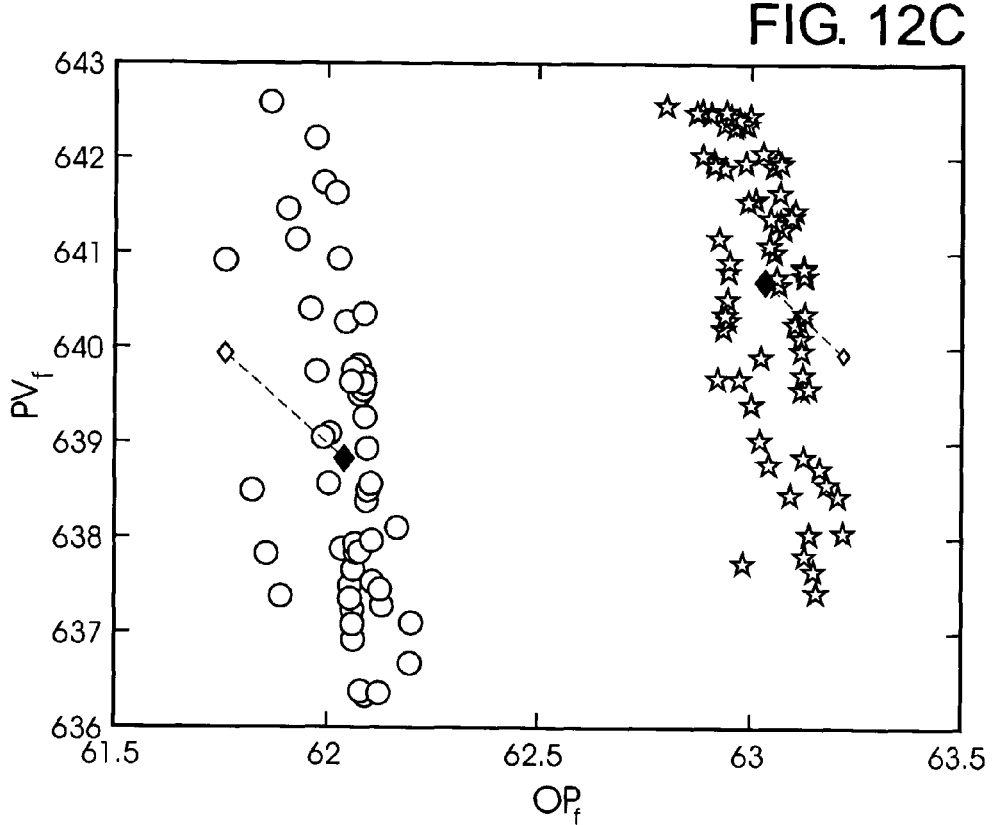
Figure 12D:
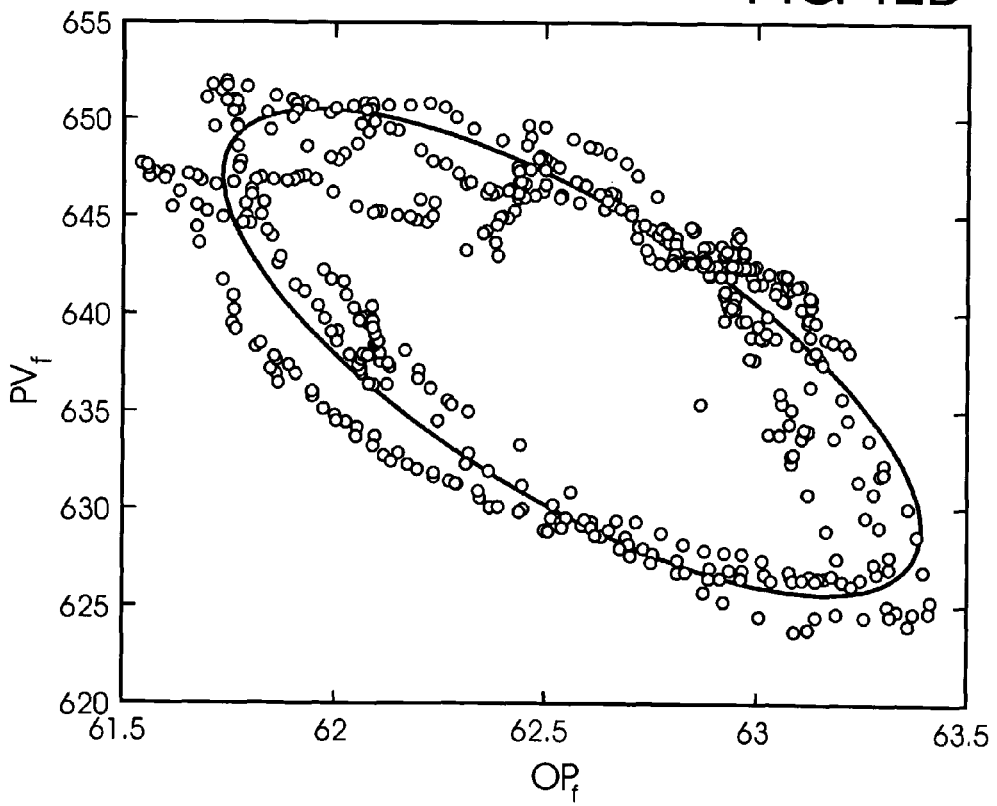
Figure 13A:
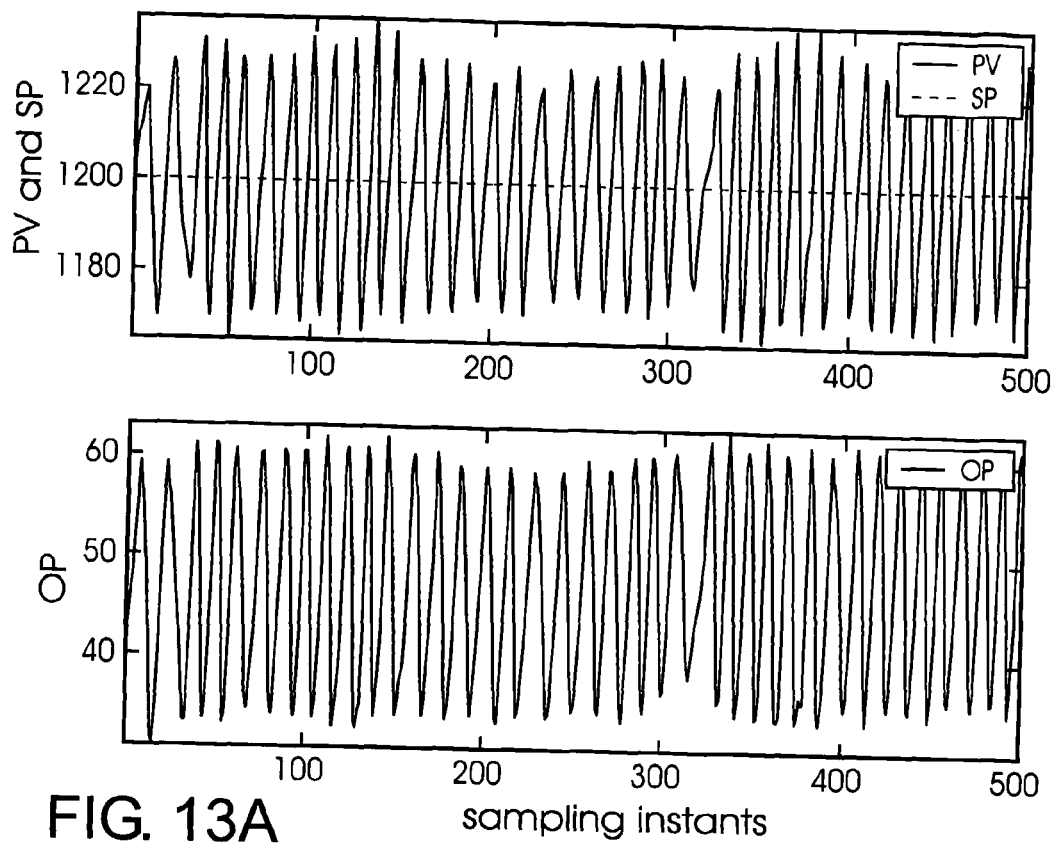
FIGS. 13(a)-13(d) show the results of the analysis of a refinery pressure control loop.
Figure 13B:
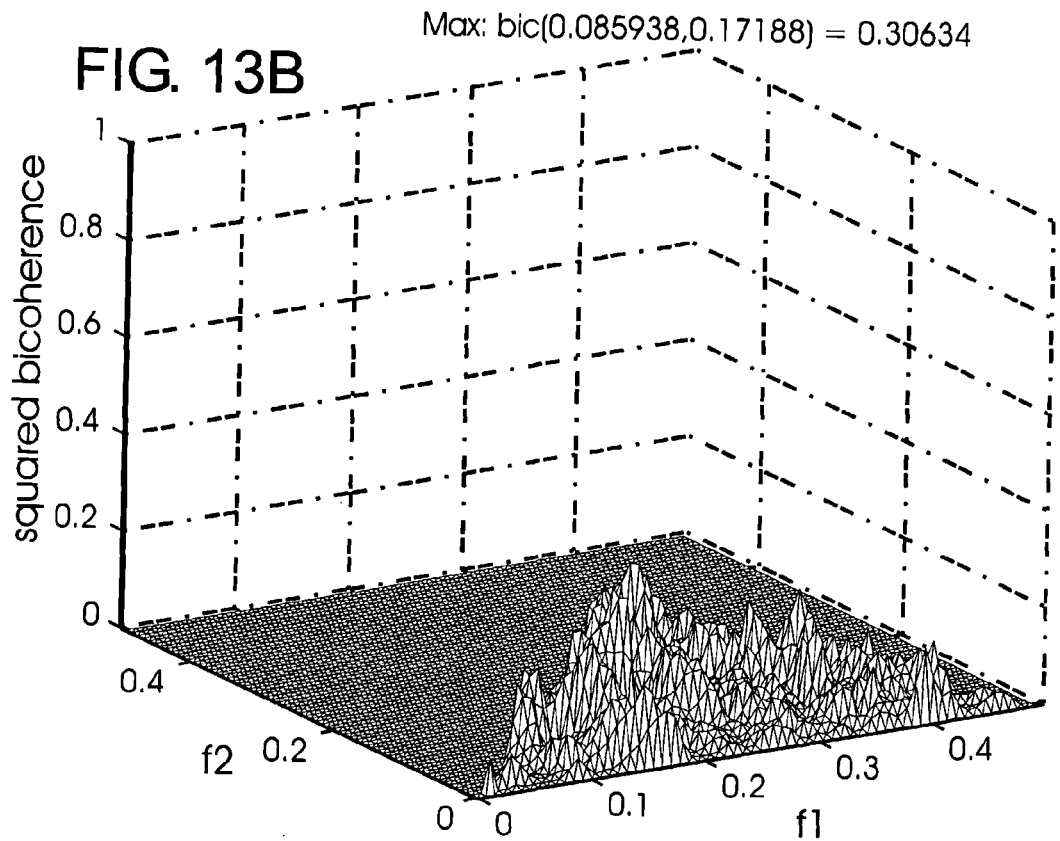
Figure 13C:
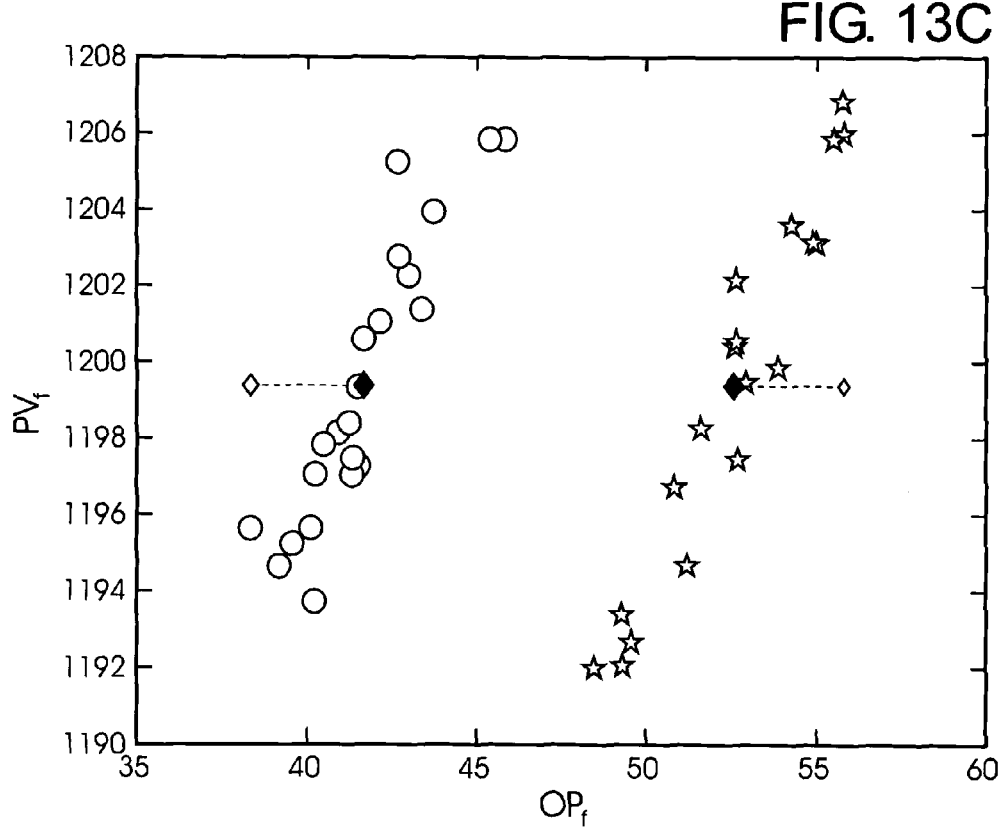
Figure 13D:
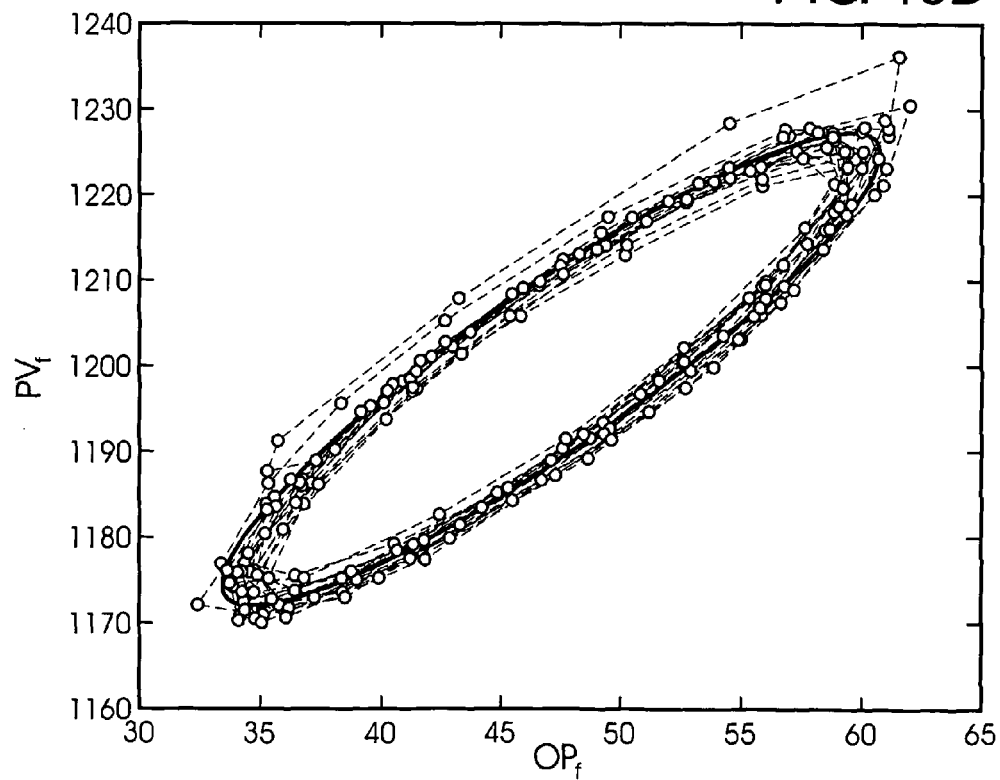
Figure 14A:
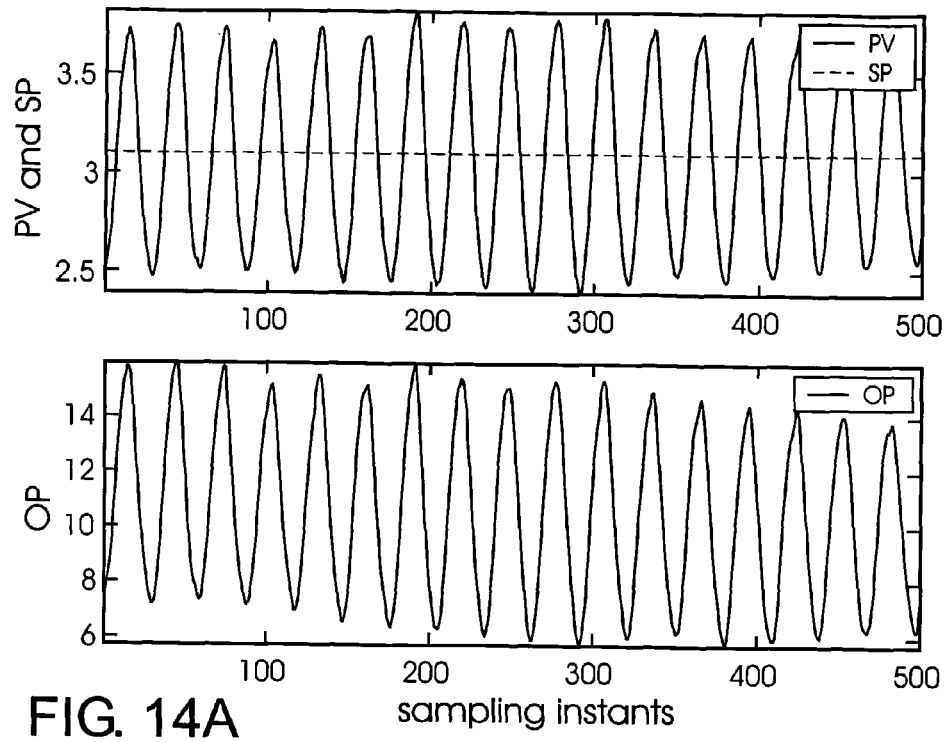
FIGS. 14(a)-14(d) show the results of the analysis of a composition control loop.
Figure 14B:
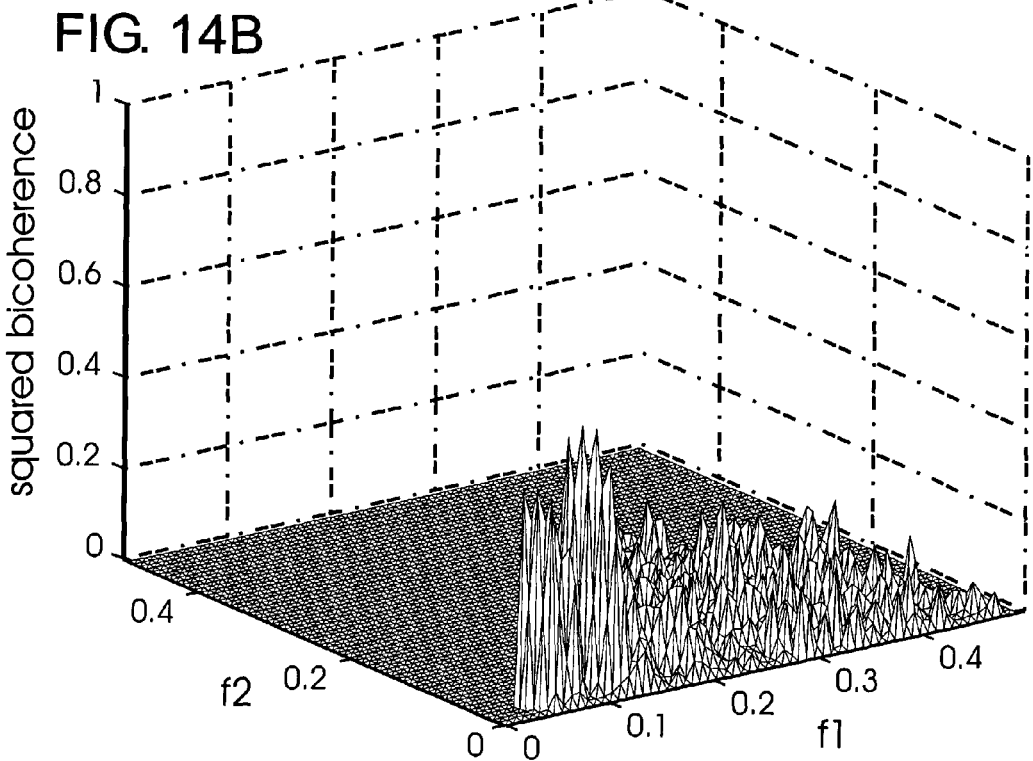
Figure 14C:
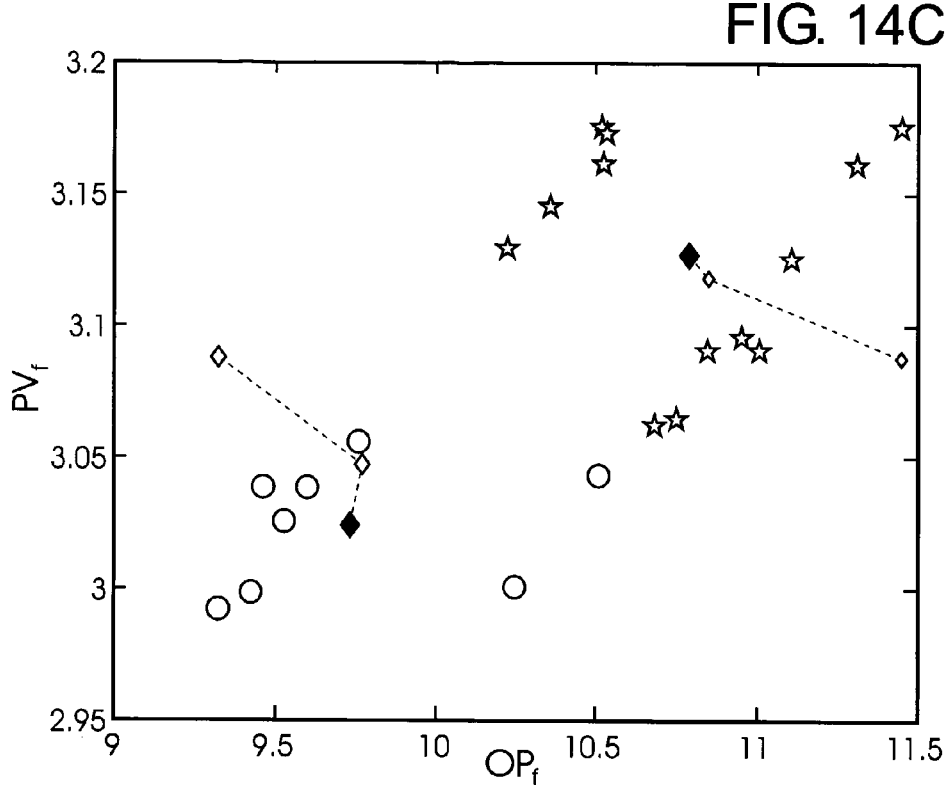
Figure 14D:
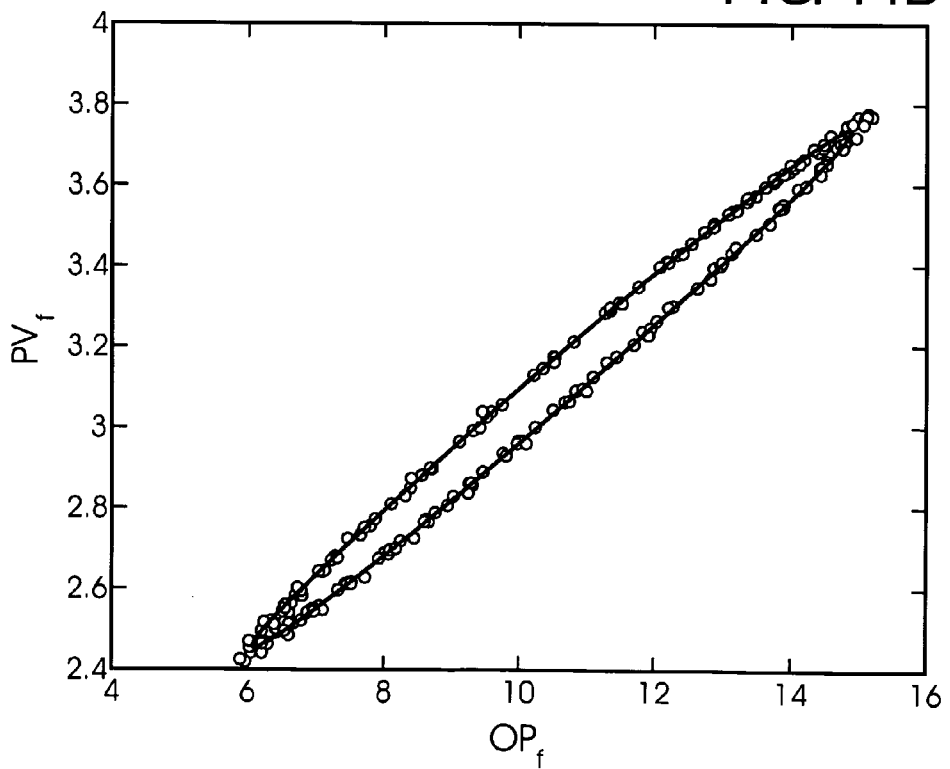

This loop is another level control loop in the same power plant described in Example 1. It also controls the level of a condenser located at the outlet of a different turbine by manipulating the flow rate of the liquid condensate. FIG. 10(*a*) shows the time trend of the sp, pv, and op data. FIG. 10(*b*) shows the squared bicoherence plot for the control error signal. The magnitude of NGI was −0.02, clearly indicating that non-linearity is not a problem for this loop. FIG. 10(*c*) shows the valve positioner (mv) vs. controller output (op) plot which demonstrates that the valve shows a linear response.

Example 4.3

A Flow Control Loop

This is a flow control loop obtained from a refinery. The results of the analysis of this loop are shown in FIG. 11 and also in the third row of the Table 1 (below). The presence of small amount of stiction (0.35% for loop 3) was causing a large amplitude oscillation (look at the magnitude of pv in FIG. 11(*a*) in this loop).

Example 4.4

A Temperature Control Loop

This is a temperature control loop on a furnace feed dryer system at the Teck-Cominco mine plant, British Columbia, Canada. The temperature of the dryer combustion chamber is controlled by manipulating the flow rate of natural gas to the combustion chamber. The top left plot of the FIG. 12 shows time trends of temperature (pv), set point (sp) and controller output (op). It shows clear oscillations both in the controlled variable (pv) and the controller output.

The other results are presented in the sixth row of the Table 1 (below) and in FIG. 12. The amount of stiction found in this loop was approximately 1%.

Example 4.5

A Pressure Control Loop

This is a pressure control loop in a refinery plant. This data set had only 1500 data points collected at 20 s sampling intervals. The time trends in FIG. 13 shows oscillations with 12.2 samples for both in pv and op variables. The detailed results of the analysis are presented in FIG. 13 and in the 5th row of Table 1. The apparent stiction present in the valve was approximately 11%.

Example 4.6

A Composition Control Loop

This describes a concentration control loop. The data set contains 1100 data points collected at 1 s sampling intervals. The time trends in FIG. 14(*a*) shows oscillations with 28.3 samples for both in pv and op variables. The detailed results of the analysis are presented in FIG. 14 and also in the 6th row of Table 1 (below). The apparent stiction present in the valve of this concentration control loop was approximately 1%.

TABLE 1

Numerical Results for the Industrial Loops Analyses

| Loop No. | Loop Type | NGI | NLI | $\omega_L$ | $\omega_H$ | Oscillation Period, Tp | Oscillation Index, r | Apparent Stiction % c-means | Apparent Stiction % ellipse |
|---|---|---|---|---|---|---|---|---|---|
| 1 | Level | 0.1 | 0.40 | 0.001 | 0.1 | 50 | 22 | 4.2 | 4.3 |
| 2 | Level | −0.02 | — | — | — | 95 | 3.5 | — | — |
| 3 | Flow | 0.01 | 0.55 | 0.001 | 0.08 | 45 | 8.4 | 0.35 | 0.33 |
| 4 | Temp | 0.003 | 0.19 | 0.004 | 0.28 | 125 | 6.5 | 1.00 | 1.14 |
| 5 | Pressure | 0.02 | 0.17 | 0.01 | 0.25 | 12.2 | 12.2 | 11.00 | 11 |
| 6 | Composition | 0.02 | 0.38 | 0.01 | 0.15 | 28.3 | 11.6 | 1 | 1 |

REFERENCES

The following references referred to within are incorporated herein by reference as if reproduced herein in their entirety.

Aubrun, C., M. Robert and T. Cecchin (1995). Fault detection in control loops. Control Engineering Practice 3, 1441-1446.

Bezdek, J. C. (1981). Pattern Recognition with Fuzzy Objective Function Algorithms. Plenum. New York.

Bialkowski, W. L. (1992). Dreams vs. reality: A view from both sides of the gap. In: Control Systems. Whistler, BC, Canada. pp. 283-294.

Choudhury, M. A. A. S., Sirish L. Shah and Nina F. Thornhill (2002). Detection and diagnosis of system non-linearities using higher order statistics. In: 15th IFAC World Congress. Barcelona, Spain.

Choudhury, M. A. A. S., Nina F. Thornhill and Sirish L. Shah (2004a). A data-driven model for valve stiction. In: The proceedings of ADCHEM 2004, Jan. 11-14. Hong Kong.

Choudhury, M. A. A. S., Sirish L. Shah and Nina F. Thornhill (2004b). Diagnosis of poor control loop performance using higher order statistics. Automatica, Vol. 40(10), pp. 1719-1728.

Choudhury, Md. A. A. S. (2004c). Detection and diagnosis of control loop non-linearities, valve stiction and data compression. Phd thesis. Department of Chemical and Materials Engineering, University of Alberta, Canada.

Choudhury, M. A. A. S., Nina F. Thornhill and Sirish L. Shah (2005). Modelling valve stiction. Control Engineering Practice, Vol. 13, pp. 641-658.

Desborough, L. and R. Miller (2002). Increasing customer value of industrial control performance monitoring—honeywell's experience. In: AIChE Symposium Series 2001. number 326. pp. 172-192.

Desborough, L., R. Miller and P. Nordh (2000). Regulatory control survey. Honeywell, unpublished manuscript.

Dulyakarn, Pomphan and Yuttapong Rangsanseri (2001). Fuzzy c-means clustering using spatial information with application to remote sensing. Singapore. Presented at the $22^{nd}$ Asian Conference on Remote Sensing.

EnTech (1998). EnTech Control Valve Dynamic Specification (version 3.0).

Gander, Walter, Gene H. Golub and Rolf Strebel (1994). Fitting of circles and ellipses least squares solution. BIT Numerical Mathematics 34, 558578.

Gerry, John and Michel Ruel (2001). How to measure and combat valve stiction online. Instrumentation, Systems and Automated Society. Houston, Texas, USA. http://www.expertune.com/articles/isa2001/StictionMR.htm.

Hagglund, T. (1995). A control loop performance monitor. Control Engg. Practice 3(11), 1543-1551.

Horch, A., A. J. Isaksson and K. Forsman (2000). Diagnosis and characterization of oscillations in process control loops. In: Proceedings of the Control Systems 2000. Victoria, Canada. pp. 161-165.

Horch, A. and A. J. Isaksson (2001). Diagnosis of oscillations in control loops. In: ACC workshop on How Well is Your Controller Performing. Arlington, Va., USA.

Horch, Alexander (1999). A simple method for detection of stiction in control valves. Control Engineering Practice 7, 1221-1231.

Horch, Alexander (2000). Condition Monitoring of Control Loops. PhD thesis. Royal Institute of Technology. Stockholm, Sweden.

ISA Committee SP51 (1996). Method of evaluating the performance of positioners with analog input signals and pneumatic output. Technical Report ANSI/ISA-75.13-1996. Instrument Society of America.

ISA Committee SP51 (2001). Control valve terminology. Technical Report ANSI/ISA-75.05.01-2000. Instrument Society of America.

Johnson, R. A. and D. W. Wichern (1998). Applied Multivariate Statistical Analysis. Prentice-Hall. New Jersey.

McMillan, G. K. (1995). Improve control valve response. Chemical Engineering Progress: Measurement and Control pp. 77-84.

Piipponen, Juha (1996). Controlling processes with non-ideal valves: Tuning of loops and selection of valves. In: Control Systems. Chateau, Halifax, Nova Scotia, Canada. pp. 179-186.

Press, W. H., B. P. Flannery, S. A. Teukolsky and W. T. Vetterling (1986). Numerical Recipes. Cambridge University Press. Cambridge.

Rengaswamy, R., T. Hagglund and V. Venkatasubramanian (2001). A qualitative shape analysis formalism for monitoring control loop performance. Engng. Appl. Artificial Intell. 14, 23-33.

Ruel, Michel (2000). Stiction: The hidden menace. Control Magazine. http://www.expertune.com/articles/Ruel-Nov2000/stiction.html.

Sharif, M. A. and R. I. Grosvenor (1998). Process plant condition monitoring and fault diagnosis. Proc Instn Mec Engrs 212(Part E), 13-30.

Stenman, A., F. Gustafsson and K. Forsman (2003). A segmentation-based method for detection of stiction in control valves. International Journal of Adaptive Control and Signal Processing 17, 625-634.

Taha, Othman, Guy A. Dumont and Michael S. Davies (1996). Detection and diagnosis of oscillations in control loops. In: Proceedings of the 35th conference on Decision and Control. Kobe, Japan.

Thornhill, N. F., B. Huang and H. Zhang (2003). Detection of multiple oscillations in control loops. Journal of Process Control 13, 91-100.

Wallén, Anders (1997). Valve diagnostics and automatic tuning. In: Proceedings of the American Control Conference. Albuquerque, New Mexico. pp. 2930-2934.

We claim:

1. A method for detecting and quantifying stiction in an industrial control loop comprising a control valve, comprising the steps of:
    (a) obtaining process output (pv) and controller output (op) data from operation of the control valve;
    (b) determining whether or not the control error signal (sp-pv), or the pv signal, or the op signal, is non-Gaussian and non-linear, by determining a Non-Gaussianity Index (NGI) and a Non-Linearity Index (NLI), where both the NGI and the NLI are greater than zero in accordance with $$NGI \triangleq \overline{\hat{bic}^2} - \overline{bic^2_{crit}}$$

$$NLI \triangleq \left| \hat{bic}^2_{max} - \left( \overline{\hat{bic}^2} + 2\sigma_{bic^2} \right) \right|$$

where $\overline{\hat{bic}^2}$ is the average squared bicoherence and $\hat{bic}^2_{max}$ is the maximum squared bicoherence, $\sigma_{bic}^2$ is the standard deviation of the squared bicoherence and $bic^2_{crit}$ is the statistical threshold/critical value obtained from the central chi-square distribution of squared bicoherence;
    (c) if the control error signal, or the pv signal, or the op signal is both non-Gaussian and non-linear, obtaining the pv and op relationship;
    (d) choosing a segment of the pv-op data which has a regular oscillation;
    (e) determining from the pv-op data segment whether or not the process is suffering from stiction by determining whether a plot of the pv-op data segment is elliptical; and
    (f) quantifying the amount of apparent stiction by measuring the width of the ellipse of the pv-op data in the direction of op.

2. The method of claim 1 further comprising the step of prioritizing sticky valves which require maintenance based on the amount of stiction quantified.

3. The method of claim 1 wherein sp data is also obtained from the process and is directly used to determine whether or not the control error signal is non-Gaussian and non-linear.

4. The method of claim 1 wherein the width of the ellipse is determined by
    (i) clustering the data and determining the absolute value of the difference between the coordinates of the centres of two clusters in the op direction; or
    (ii) fitting an ellipse onto the data, and determining the maximum width of the fitted ellipse in the op direction.

5. The method of claim 4 wherein the width of the cycles is measured by a C-means clustering, a fuzzy C-means clustering or a fitted ellipse method.

* * * * *